United States Patent
Cai et al.

(10) Patent No.: US 10,237,709 B2
(45) Date of Patent: Mar. 19, 2019

(54) ONLINE CHARGING METHOD, GATEWAY DEVICE, AND ONLINE CHARGING DEVICE

(71) Applicant: Huawei Technologies Co., Ltd., Shenzhen (CN)

(72) Inventors: Hui Cai, Shenzhen (CN); Weiqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 15/399,872

(22) Filed: Jan. 6, 2017

(65) Prior Publication Data

US 2017/0118617 A1   Apr. 27, 2017

Related U.S. Application Data

(63) Continuation of application No. PCT/CN2014/081846, filed on Jul. 8, 2014.

(51) Int. Cl.
| | | |
|---|---|---|
| *H04W 4/24* | (2018.01) | |
| *H04M 15/00* | (2006.01) | |
| *H04W 88/16* | (2009.01) | |

(52) U.S. Cl.
CPC .......... *H04W 4/24* (2013.01); *H04M 15/61* (2013.01); *H04M 15/62* (2013.01); *H04M 15/64* (2013.01); *H04W 88/16* (2013.01)

(58) Field of Classification Search
CPC ....... H04W 4/24; H04W 88/16; H04M 15/64; H04M 15/61; H04M 15/62
See application file for complete search history.

(56) References Cited

U.S. PATENT DOCUMENTS

| | | | |
|---|---|---|---|
| 8,064,877 B2 | 11/2011 | Li et al. | |
| 2002/0006780 A1 | 1/2002 | Bjelland et al. | |
| 2006/0014541 A1* | 1/2006 | Kato .................. | H04W 16/00 455/446 |
| 2006/0270423 A1 | 11/2006 | Hellgren | |
| 2007/0232301 A1* | 10/2007 | Kueh .................. | H04W 8/082 455/433 |
| 2009/0137226 A1 | 5/2009 | Shan et al. | |
| 2009/0228956 A1* | 9/2009 | He .................... | H04L 63/20 726/1 |

(Continued)

FOREIGN PATENT DOCUMENTS

| | | |
|---|---|---|
| CN | 101374055 A | 2/2009 |
| CN | 101729265 A | 6/2010 |

(Continued)

OTHER PUBLICATIONS

Machine Translation and Abstract of Chinese Publication No. CN102075859, May 25, 2011, 11 pages.

(Continued)

*Primary Examiner* — Mehmood B. Khan
(74) *Attorney, Agent, or Firm* — Conley Rose, P.C.

(57) ABSTRACT

According to the present disclosure, a first session is established between an online charging system (OCS) and a user plane of a gateway device by using a service identifier, so that direct interaction between the user plane of the gateway device and the OCS is implemented, and a technical problem that a gateway device in a decoupled architecture has an extremely long charging path and a large charging delay is resolved.

24 Claims, 9 Drawing Sheets

(56) References Cited

U.S. PATENT DOCUMENTS

| | | | |
|---|---|---|---|
| 2010/0229232 A1 | 9/2010 | Hellgren et al. | |
| 2012/0005357 A1* | 1/2012 | Hellgren | H04L 12/14 709/229 |
| 2012/0173661 A1* | 7/2012 | Mahaffey | H04L 67/14 709/217 |
| 2012/0202491 A1* | 8/2012 | Fox | H04B 7/2609 455/435.1 |
| 2013/0315230 A1* | 11/2013 | Li | H04L 12/14 370/352 |
| 2014/0140321 A1* | 5/2014 | Janakiraman | H04L 69/08 370/331 |
| 2014/0344441 A1* | 11/2014 | Janakiraman | H04L 43/12 709/224 |
| 2015/0016307 A1* | 1/2015 | Liu | H04W 4/70 370/259 |
| 2015/0304865 A1* | 10/2015 | Poscher | H04W 76/10 370/252 |
| 2017/0163431 A1* | 6/2017 | Castro Castro | H04L 12/1407 |
| 2017/0214803 A1* | 7/2017 | Barault | H04L 12/1467 |

FOREIGN PATENT DOCUMENTS

| | | | |
|---|---|---|---|
| CN | 102075859 A | | 5/2011 |
| CN | 102137450 A | | 7/2011 |
| CN | 103517245 A | * | 1/2014 |
| RU | 2376721 C2 | | 12/2009 |
| RU | 2417536 C2 | | 4/2011 |
| RU | 2454030 C1 | | 6/2012 |
| WO | 2009024048 A1 | | 2/2009 |
| WO | 2013139230 A1 | | 9/2013 |

OTHER PUBLICATIONS

Machine Translation and Abstract of Chinese Publication No. CN103517245, Jan. 15, 2014, 19 pages.
"3rd Generation Partnership Project; Technical Specification Group Services and Systems Aspects; General Packet Radio Services (GPRS); Service description; Stage 2 (Release 12)," Technical Specification, 3GPP TS 23.060, V12.5.0, Jun. 2014, 347 pages.
Foreign Communication From a Counterpart Application, European Application No. 14896970.2, Extended European Search Report dated Jun. 7, 2017, 9 pages.
Foreign Communication From a Counterpart Application, PCT Application No. PCT/CN2014/081846, English Translation of International Search Report dated Mar. 27, 2015, 2 pages.
Foreign Communication From a Counterpart Application, PCT Application No. PCT/CN2014/081846, English Translation of Written Opinion dated Mar. 27, 2015, 8 pages.
Machine Translation and Abstract of Russian Publication No. RU2454030, Jun. 20, 2012, 13 pages.
Machine Translation and Abstract of International Publication No. WO2013139230, Sep. 26, 2013, 18 pages.
Foreign Communication From a Counterpart Application, Russian Application No. 2017103781, Russian Office Action dated Apr. 23, 2018, 5 pages.
Foreign Communication From a Counterpart Application, Russian Application No. 2017103781, Russian Search Report dated Apr. 23, 2018, 2 pages.
Machine Translation and Abstract of Chinese Publication No. CN101729265, Jun. 9, 2010, 29 pages.
Machine Translation and Abstract of Chinese Publication No. CN102137450, Jul. 27, 2011, 18 pages.
Foreign Communication From a Counterpart Application, Chinese Application No. 201480033997.9, Chinese Office Action dated Oct. 8, 2018, 9 pages.

\* cited by examiner

A control plane entity of a gateway device sends a service identifier to a user plane entity of the gateway device, where the service identifier is used by the user plane entity of the gateway device to interact with an online charging system according to the service identifier, so as to establish a first session associated with a service and perform charging interaction on the first session, and the first session is a session between the user plane entity of the gateway device and the online charging system ⎯ 101

FIG. 1

A user plane entity of a gateway device receives a service identifier sent by a control plane entity of the gateway device ⎯ 201

The user plane entity of the gateway device establishes a first session, which is associated with a service, with an online charging system by using the service identifier ⎯ 202

The user plane entity of the gateway device performs charging interaction on the first session with the online charging system ⎯ 203

FIG. 2

An online charging system interacts with a user plane entity of a gateway by using a service identifier, so as to establish a first session associated with a service ⎯ 301

The online charging system performs charging interaction on the first session with the user plane entity of the gateway ⎯ 302

FIG. 3

ONLINE CHARGING METHOD, GATEWAY DEVICE, AND ONLINE CHARGING DEVICE

CROSS-REFERENCE TO RELATED APPLICATIONS

This application is a continuation application of international patent application number PCT/CN2014/081846 filed on Jul. 8, 2014, which is incorporated by reference.

TECHNICAL FIELD

Embodiments of the present disclosure relate to communications technologies, and in particular, to an online charging method, a gateway device, and an online charging device.

BACKGROUND

An online charging system (OCS) is a system that performs charging interaction in real time based on service usage. The OCS mainly refers to a charging system that participates in communication process control and that can resolve problems such as user real-time credit control, usage of a prepaid data service, and real-time charging for a value-added service.

User equipment accesses the OCS by using a gateway. For security and other considerations, a gateway device is further decoupled into a control plane entity of the gateway device and a user plane entity of the gateway device. The control plane entity of the gateway device implements user access control, charging policy control, charging data record management, and the like. The user plane entity of the gateway device implements service data forwarding, and executes a control and charging policy and the like delivered by the control plane entity of the gateway device.

However, after a gateway device is decoupled into a control plane entity of the gateway device and a user plane entity of the gateway device, there exists a technical problem that a charging path is extremely long and a charging delay is large in some approaches.

SUMMARY

Embodiments of the present disclosure provide an online charging method, a gateway device, and an online charging device, so as to resolve a technical problem that a gateway device in a decoupled architecture has an extremely long charging path and a large charging delay.

A first aspect of the present disclosure provides an online charging method, including:

sending, by a control plane entity of a gateway device, a service identifier to a user plane entity of the gateway device, where the service identifier is used by the user plane entity of the gateway device to establish a first session, which is associated with the service, with an OCS according to the service identifier and perform charging interaction on the first session, and the first session is a session between the user plane entity of the gateway device and the OCS.

With reference to the first aspect, in a first implementable manner, before the sending, by a control plane entity of a gateway device, a service identifier to a user plane entity of the gateway device, the method further includes: interacting, by the control plane entity of the gateway device, with the OCS, so as to establish a second session associated with the service requested by a user and determine the service identifier of the service, where the second session is a session between the control plane entity of the gateway device and the OCS.

With reference to the first implementable manner of the first aspect, in a second implementable manner, the interacting, by the control plane entity of the gateway device, with the OCS, so as to establish a second session associated with the service requested by a user and determine the service identifier of the service includes: sending, by the control plane entity of the gateway device, a credit control request (CCR) message to the OCS, where the CCR message includes the service identifier, which is allocated by the control plane entity of the gateway device, of the service, and receiving, by the control plane entity of the gateway device, a credit control answer (CCA) message sent by the OCS, and establishing the second session associated with the service.

With reference to the first implementable manner of the first aspect, in a third implementable manner, the interacting, by the control plane entity of the gateway device, with the OCS, so as to establish a second session associated with the service requested by a user and determine the service identifier of the service includes: sending, by the control plane entity of the gateway device, a CCR message to the OCS; and receiving, by the control plane entity of the gateway device, a CCA message sent by the OCS, where the CCA message includes the service identifier, which is allocated by the OCS, of the service, and establishing the second session associated with the service.

With reference to the second implementable manner of the first aspect or with reference to the third implementable manner of the first aspect, in a fourth implementable manner, the CCA message further includes information about a first usage quota; and after the receiving, by the control plane entity of the gateway device, a CCA message sent by the OCS, the method further includes sending, by the control plane entity of the gateway device, the information about the first usage quota to the user plane entity of the gateway device, where the user plane entity of the gateway device performs charging interaction on the first session with the OCS according to the information about the first usage quota.

With reference to any one of the first aspect, or the first to the fourth implementable manners of the first aspect, in a fifth implementable manner, the service identifier includes at least one of the following: an international mobile subscriber identity (IMSI) of user equipment, an identifier of the second session, a hash value of an IMSI of user equipment, an establishing moment of the second session, or a random number.

With reference to any one of the first aspect, or the first to the fifth implementable manners of the first aspect, in a sixth implementable manner, the method further includes: receiving, by the control plane entity of the gateway device, a quota exhaustion message sent on the second session by the OCS, or receiving, by the control plane entity of the gateway device, a quota exhaustion message sent by the user plane entity of the gateway device; and interacting, by the control plane entity of the gateway device, with the OCS so as to deactivate the second session.

A second aspect of the present disclosure provides an online charging method, including: receiving, by a user plane entity of a gateway device, a service identifier sent by a control plane entity of the gateway device; establishing, by the user plane entity of the gateway device, a first session, which is associated with the service, with the OCS according to the service identifier; and performing, by the user plane entity of the gateway device, charging interaction on the first session with the OCS.

With reference to the second aspect, in a first implementable manner, before the performing, by the user plane entity of the gateway device, charging interaction on the first session with the OCS, the method further includes: receiving, by the user plane entity of the gateway device, a first usage quota sent by the control plane entity of the gateway device, and performing, by the user plane entity of the gateway device, charging interaction with the OCS by using the first usage quota.

With reference to the first implementable manner of the second aspect, in a second implementable manner, the performing, by the user plane entity of the gateway device, charging interaction on the first session with the OCS includes: determining, by the user plane entity of the gateway device, quota usage information by using the first usage quota; and according to the quota usage information, performing, by the user plane entity of the gateway device, charging interaction on the first session with the OCS, and receiving a second usage quota that is allocated by the OCS to the service; or according to the quota usage information, performing, by the user plane entity of the gateway device, charging interaction on the first session with the OCS, sending, by the user plane entity of the gateway device, a quota exhaustion message to the OCS, deactivating the first session, and sending a quota exhaustion message to the control plane entity of the gateway device, so that the control plane entity of the gateway device interacts with the OCS.

With reference to the second aspect, in a third implementable manner, the performing, by the user plane entity of the gateway device, charging interaction on the first session with the OCS includes: performing, by the user plane entity of the gateway device, charging interaction on the first session with the OCS according to quota usage information; or according to quota usage information, performing, by the user plane entity of the gateway device, charging interaction on the first session with the OCS, and deactivating the first session.

With reference to any one of the second aspect, or the first to the third implementable manners of the second aspect, in a fourth implementable manner, the service identifier includes at least one of the following: an IMSI of user equipment, an identifier of the second session, a hash value of an IMSI of user equipment, an establishing moment of the second session, or a random number.

A third aspect of the present disclosure provides an online charging method, including: interacting, by an OCS, with a user plane entity of a gateway according to a service identifier, so as to establish a first session associated with a service requested by a user; and performing, by the OCS, charging interaction on the first session with the user plane entity of the gateway.

With reference to the third aspect, in a first implementable manner, before the interacting, by an OCS, with a user plane entity of a gateway according to a service identifier, so as to establish a first session associated with the service, the method further includes: interacting, by the OCS, with a control plane entity of the gateway device, so as to establish a second session associated with the service requested by the user and determine the service identifier of the service, where the second session is a session between the control plane entity of the gateway device and the OCS, and the control plane entity of the gateway device sends the service identifier to the user plane entity of the gateway device.

With reference to the first implementable manner of the third aspect, in a second implementable manner, the interacting, by the OCS, with a control plane entity of the gateway device, so as to establish a second session associated with the service requested by the user and determine the service identifier of the service includes: receiving, by the OCS, a CCR message sent by the control plane entity of the gateway device, where the CCR message includes the service identifier, which is allocated by the control plane entity of the gateway device, of the service, and the control plane entity of the gateway sends the service identifier to the user plane entity of the gateway device; and sending, by the OCS, a CCA message to the control plane entity of the gateway device, so as to establish the second session associated with the service.

With reference to the first implementable manner of the third aspect, in a third implementable manner, the interacting, by the OCS, with a control plane entity of the gateway device, so as to establish a second session associated with the service requested by the user and determine the service identifier of the service includes: receiving, by the OCS, a CCR message sent by the control plane entity of the gateway device; and sending, by the OCS, a CCA message to the control plane entity of the gateway device, where the CCA message includes the service identifier, which is allocated by the OCS, of the service, and establishing the second session associated with the service, so that the control plane entity of the gateway sends the service identifier to the user plane entity of the gateway device.

With reference to the second implementable manner of the third aspect or with reference to the third implementable manner of the third aspect, in a fourth implementable manner, after the receiving, by the OCS, a CCR message sent by the control plane entity of the gateway device, the method further includes: allocating, by the OCS, a first usage quota, where the first usage quota is used by the OCS to perform charging on the service.

With reference to the fourth implementable manner of the third aspect, in a fifth implementable manner, the CCA message further includes information about the first usage quota, and the control plane entity of the gateway device sends the information about the first usage quota to the user plane entity of the gateway device.

With reference to the fifth implementable manner of the third aspect, in a sixth implementable manner, the performing, by the OCS, charging interaction on the first session with the user plane entity of the gateway includes: according to quota usage information, performing, by the OCS, charging interaction on the first session with the user plane entity of the gateway device, and sending a second usage quota to the user plane entity of the gateway device; or according to quota usage information, performing, by the OCS, charging interaction on the first session with the user plane entity of the gateway device, and deactivating the first session with the user plane entity of the gateway device after the charging interaction is complete.

With reference to the fourth implementable manner of the third aspect, in a seventh implementable manner, the performing, by the OCS, charging interaction on the first session with the user plane entity of the gateway includes: determining, by the OCS, quota usage information by using the first usage quota; and according to the quota usage information, performing, by the OCS, charging interaction on the first session with the user plane entity of the gateway device, and allocating a second usage quota to the service; or according to the quota usage information, performing, by the OCS, charging interaction on the first session with the user plane entity of the gateway device, deactivating the first session, and performing interaction on the second session with the control plane entity of the gateway device so as to deactivate the second session.

With reference to any one of the third aspect, or the first to the seventh implementable manners of the third aspect, the service identifier includes at least one of the following: an IMSI of user equipment, an identifier of the second session, a hash value of an IMSI of user equipment, an establishing moment of the second session, or a random number.

A fourth aspect of the present disclosure provides a control plane device of a gateway device, including: a first interaction module configured to send a service identifier to a user plane entity of the gateway device, where the service identifier is used by the user plane entity of the gateway device to interact with an OCS according to the service identifier, so as to establish a first session associated with the service and perform charging interaction on the first session, and the first session is a session between the user plane entity of the gateway device and the OCS.

With reference to the fourth aspect, in a first implementable manner, the device further includes: a second interaction module configured to: before the first interaction module sends the service identifier to the user plane entity of the gateway device, interact with the OCS, so as to establish a second session associated with the service requested by a user and determine the service identifier of the service, where the second session is a session between a control plane entity of the gateway device and the OCS.

With reference to the first implementable manner of the fourth aspect, in a second implementable manner, the second interaction module is further configured to: send a CCR message to the OCS, where the CCR message includes the service identifier, which is determined by the second interaction module, of the service; and receive a CCA message sent by the OCS, and establish the second session associated with the service.

With reference to the first implementable manner of the fourth aspect, in a third implementable manner, the second interaction module is further configured to: send a CCR message to the OCS; and receive a CCA message sent by the OCS, where the CCA message includes the service identifier, which is allocated by the OCS, of the service, and establish the second session associated with the service.

With reference to the first implementable manner of the fourth aspect or with reference to the second implementable manner of the fourth aspect, in a fourth implementable manner, the CCA message further includes information about a first usage quota; and the first interaction module is further configured to: after the second interaction module receives the CCA message sent by the OCS, send the information about the first usage quota to the user plane entity of the gateway device, where the user plane entity of the gateway device performs charging interaction on the first session with the OCS according to the first usage quota.

With reference to any one of the fourth aspect, or the first to the fourth implementable manners of the fourth aspect, in a fifth implementable manner, the service identifier includes at least one of the following: an IMSI of user equipment, an identifier of the second session, a hash value of an IMSI of user equipment, an establishing moment of the second session, or a random number.

With reference to the fourth aspect, or the first to the fifth implementable manners of the fourth aspect, in a sixth implementable manner, the second interaction module is further configured to receive a quota exhaustion message sent on the second session by the OCS, and interact with the OCS so as to deactivate the second session; or the first interaction module is further configured to receive a quota exhaustion message sent by the user plane entity of the gateway device.

A fifth aspect of the present disclosure provides a user plane device of a gateway device, including: a third interaction module configured to receive a service identifier sent by a control plane entity of the gateway device; and a fourth interaction module configured to establish a first session, which is associated with the service, with the OCS according to the service identifier, and perform charging interaction on the first session with the OCS.

With reference to the fifth aspect, in a first implementable manner, the third interaction module is further configured to receive information about a first usage quota sent by the control plane entity of the gateway device; and the fourth interaction module is further configured to perform charging interaction with the OCS by using the information about the first usage quota.

With reference to the first implementable manner of the fifth aspect, in a second implementable manner, the fourth interaction module is specifically configured to: determine quota usage information by using the first usage quota; and according to the quota usage information, perform charging interaction on the first session with the OCS, and receive a second usage quota that is allocated by the OCS to the service; or according to the quota usage information, perform charging interaction on the first session with the OCS, send a quota exhaustion message to the OCS, and deactivate the first session; where the third interaction module is further configured to send a quota exhaustion message to the control plane entity of the gateway device.

With reference to the fifth aspect, in a third implementable manner, the fourth interaction module is specifically configured to: perform charging interaction on the first session with the OCS according to quota usage information; or according to quota usage information, perform charging interaction on the first session with the OCS, and deactivate the first session.

With reference to the fifth aspect, or the first to the third implementable manners of the fifth aspect, in a fourth implementable manner, the service identifier includes at least one of the following: an IMSI of user equipment, an identifier of the second session, a hash value of an IMSI of user equipment, an establishing moment of the second session, or a random number.

A sixth aspect of the present disclosure provides a gateway device, including: the control plane device of the gateway device according to any one of the fourth aspect of the present disclosure, or the first to the sixth implementable manners of the fourth aspect of the present disclosure, and the control plane device of the gateway device according to any one of the fifth aspect of the present disclosure, or the first to the fourth implementable manners of the fifth aspect of the present disclosure.

A seventh aspect of the present disclosure provides an online charging device, including: a fifth interaction module configured to interact with a user plane entity of a gateway, so as to establish a first session associated with a service requested by a user, and perform charging interaction on the first session with the user plane entity of the gateway.

With reference to the seventh aspect, in a first implementable manner, the device further includes a sixth interaction module; where the sixth interaction module is configured to: before the fifth interaction module interacts with the user plane entity of the gateway according to a service identifier so as to establish the first session associated with the service, interact with a control plane entity of the gateway device, so as to establish a second session associated with the service requested by the user and determine the service identifier of the service, where the second session is a session between the control plane entity of the gateway device and an OCS, and the control plane entity of the gateway device sends the service identifier to the user plane entity of the gateway device.

With reference to the first implementable manner of the seventh aspect, in a second implementable manner, the sixth interaction module is further configured to: receive a CCR message sent by the control plane entity of the gateway device, where the CCR message includes the service identifier, which is allocated by the control plane entity of the gateway device, of the service, so that the control plane entity of the gateway sends the service identifier to the user plane entity of the gateway device; and send a CCA message to the control plane entity of the gateway device, and establish the second session associated with the service.

With reference to the first implementable manner of the seventh aspect, in a third implementable manner, the sixth interaction module is further configured to: receive a CCR message sent by the control plane entity of the gateway device; and send a CCA message to the control plane entity of the gateway device, where the CCA message includes the service identifier, which is determined by the fifth interaction module, of the service, and establish the second session associated with the service, where the control plane entity of the gateway sends the service identifier to the user plane entity of the gateway device.

With reference to the second implementable manner of the seventh aspect or with reference to the third implementable manner of the seventh aspect, in a fourth implementable manner, the device further includes; an allocation module configured to allocate a first usage quota, where the first usage quota is used by the OCS to perform charging on the service.

With reference to the fourth implementable manner of the seventh aspect, in a fifth implementable manner, the CCA message further includes information about the first usage quota, and the control plane entity of the gateway device sends the information about the first usage quota to the user plane entity of the gateway device.

With reference to the fifth implementable manner of the seventh aspect, in a sixth implementable manner, the fifth interaction module is further configured to: according to quota usage information, perform charging interaction on the first session with the user plane entity of the gateway device, and send a second usage quota to the user plane entity of the gateway device; where the allocation module is further configured to allocate the second usage quota to the service; or according to quota usage information, perform charging interaction on the first session with the user plane entity of the gateway device, and deactivate the first session with the user plane entity of the gateway device after the charging interaction is complete.

With reference to the fourth implementable manner of the seventh aspect, in a seventh implementable manner, the fifth interaction module is further configured to: perform charging interaction on the first session with the user plane entity of the gateway, and is specifically configured to: determine quota usage information by using the first usage quota; and perform charging interaction on the first session with the user plane entity of the gateway device according to the quota usage information; where the allocation module is further configured to allocate a second usage quota to the service; or according to the quota usage information, perform charging interaction on the first session with the user plane entity of the gateway device, and deactivate the first session, where the sixth interaction module is further configured to perform interaction on the second session with the control plane entity of the gateway device, so as to deactivate the second session.

With reference to the seventh aspect, or the first to the seventh implementable manners of the seventh aspect, in an eighth implementable manner, the service identifier includes at least one of the following: an IMSI of user equipment, an identifier of the second session, a hash value of an IMSI of user equipment, an establishing moment of the second session, or a random number.

An eighth aspect of the present disclosure provides a control plane apparatus of a gateway device, including: a first transceiver configured to send a service identifier to a user plane entity of the gateway device, where the service identifier is used by the user plane entity of the gateway device to interact with an OCS according to the service identifier, so as to establish a first session associated with the service and perform charging interaction on the first session, and the first session is a session between the user plane entity of the gateway device and the OCS; and a first processor configured to control the first transceiver, and configured to process information that is received or sent by the first transceiver.

With reference to the eighth aspect, in a first implementable manner, the apparatus further includes: a second transceiver configured to: before the first transceiver sends the service identifier to the user plane entity of the gateway device, interact with the OCS, so as to establish a second session associated with the service requested by a user and determine the service identifier of the service, where the second session is a session between a control plane entity of the gateway device and the OCS; where the first processor is configured to control the second transceiver, and is configured to process information that is received or sent by the second transceiver.

With reference to the first implementable manner of the eighth aspect, in a second implementable manner, the second transceiver is further configured to: send a CCR message to the OCS, where the CCR message includes the service identifier, which is allocated by the control plane entity of the gateway device, of the service; and receive a CCA message sent by the OCS, and establish the second session associated with the service.

With reference to the second implementable manner of the eighth aspect, in a third implementable manner, the second transceiver is further configured to: send a CCR message to the OCS; and receive a CCA message sent by the OCS, where the CCA message includes the service identifier, which is allocated by the OCS, of the service, and establish the second session of the service.

With reference to the second implementable manner of the eighth aspect or with reference to the third implementable manner of the eighth aspect, in a fourth implementable manner, the CCA message further includes information about a first usage quota; and after the second transceiver receives the CCA message sent by the OCS, the first transceiver is further configured to: send the information about the first usage quota to the user plane entity of the gateway device, where the user plane entity of the gateway device performs charging interaction on the first session with the OCS according to the information about the first usage quota.

With reference to the eighth aspect, or the first to the fourth implementable manners of the eighth aspect, in a fifth implementable manner, the service identifier includes at least one of the following: an IMSI of user equipment, an identifier of the second session, a hash value of an IMSI of user equipment, an establishing moment of the second session, or a random number.

With reference to the eighth aspect, or the first to the fifth implementable manners of the eighth aspect, in a sixth implementable manner, the second transceiver is further configured to receive a quota exhaustion message sent on the second session by the OCS, and deactivate the second session with the OCS; or the first transceiver is further configured to receive a quota exhaustion message sent by the user plane entity of the gateway device.

A ninth aspect of the present disclosure provides a user plane apparatus of a gateway device, including: a third transceiver configured to receive a service identifier sent by a control plane entity of the gateway device; a fourth transceiver configured to establish a first session, which is associated with the service, with the OCS according to the service identifier, and perform charging interaction on the first session with the OCS; and a second processor configured to control the third transceiver and the fourth transceiver, and configured to process information that is received or sent by the third transceiver or the fourth transceiver.

With reference to the ninth aspect, in a first implementable manner, the third transceiver is further configured to receive information about a first usage quota sent by the control plane entity of the gateway device; and the fourth transceiver is further configured to perform charging interaction with the OCS by using the information about the first usage quota.

With reference to the first implementable manner of the ninth aspect, in a second implementable manner, the fourth transceiver is specifically configured to: determine quota usage information by using the first usage quota; and according to the quota usage information, perform charging interaction on the first session with the OCS, and receive a second usage quota that is allocated by the OCS to the service; or according to the quota usage information, perform charging interaction on the first session with the OCS, send a quota exhaustion message to the OCS, and deactivate the first session; where the third transceiver is further configured to send a quota exhaustion message to the control plane entity of the gateway device.

With reference to the first implementable manner of the ninth aspect, in a third implementable manner, the fourth transceiver is specifically configured to: perform charging interaction on the first session with the OCS according to quota usage information; or according to quota usage information, perform charging interaction on the first session with the OCS, and deactivate the first session.

With reference to the ninth aspect, or the first to the third implementable manners of the ninth aspect, in a fourth implementable manner, the service identifier includes at least one of the following: an IMSI of user equipment, an identifier of the second session, a hash value of an IMSI of user equipment, an establishing moment of the second session, or a random number.

A tenth aspect of the present disclosure provides a gateway apparatus, including: the control plane apparatus of the gateway device according to any one of the eighth aspect of the present disclosure, or the first to the fifth implementable manners of the eighth aspect, and the control plane apparatus of the gateway device according to any one of the ninth aspect of the present disclosure, or the first to the fourth implementable manners of the ninth aspect of the present disclosure.

An eleventh aspect of the present disclosure provides an online charging apparatus, including: a fifth transceiver configured to interact with a user plane entity of a gateway, so as to establish a first session associated with a service requested by a user, and perform charging interaction on the first session with the user plane entity of the gateway; and a third processor configured to control the fifth transceiver, and configured to process information that is received or sent by the fifth transceiver.

With reference to the eleventh aspect of the present disclosure, in a first implementable manner, the apparatus further includes: a sixth transceiver; where the sixth transceiver is configured to: before the fifth transceiver interacts with the user plane entity of the gateway according to a service identifier so as to establish the first session associated with the service, interact with a control plane entity of the gateway device, so as to establish a second session associated with the service requested by the user and determine the service identifier of the service, where the second session is a session between the control plane entity of the gateway device and an OCS, and the control plane entity of the gateway device sends the service identifier to the user plane entity of the gateway device; and the third processor is further configured to control the sixth transceiver, and configured to process information that is received or sent by the sixth transceiver.

With reference to the first implementable manner of the eleventh aspect of the present disclosure, in a second implementable manner, the sixth transceiver is further configured to; receive a CCR message sent by the control plane entity of the gateway device, where the CCR message includes the service identifier, which is allocated by the control plane entity of the gateway device, of the service, so that the control plane entity of the gateway sends the service identifier to the user plane entity of the gateway device; and send a CCA message to the control plane entity of the gateway device, and establish the second session associated with the service.

With reference to the first implementable manner of the eleventh aspect of the present disclosure, in a third implementable manner, the sixth transceiver is further configured to: receive a CCR message sent by the control plane entity of the gateway device; and send a CCA message to the control plane entity of the gateway device, where the CCA message includes the service identifier, which is allocated by the OCS, of the service, so as to establish the second session associated with the service, where the control plane entity of the gateway sends the service identifier to the user plane entity of the gateway device.

With reference to the second implementable manner of the eleventh aspect of the present disclosure or with reference to the third implementable manner of the eleventh aspect of the present disclosure, in a fourth implementable manner, the third processor is further configured to: allocate a first usage quota, where the first usage quota is used by the OCS to perform charging on the service.

With reference to the fourth implementable manner of the eleventh aspect of the present disclosure, in a fifth implementable manner, the CCA message further includes information about the first usage quota, and the control plane entity of the gateway device sends the information about the first usage quota to the user plane entity of the gateway device.

With reference to the fifth implementable manner of the eleventh aspect of the present disclosure, in a sixth implementable manner, the fifth transceiver is further configured to: according to quota usage information, perform charging interaction on the first session with the user plane entity of the gateway device, and send a second usage quota to the user plane entity of the gateway device; where the third processor is further configured to allocate the second usage quota to the service; or according to quota usage information, perform charging interaction on the first session with the user plane entity of the gateway device, and after the charging interaction is complete, interact with the user plane entity of the gateway device so as to deactivate the first session.

With reference to the fourth implementable manner of the eleventh aspect of the present disclosure, in a seventh implementable manner, the fifth transceiver is further configured to: perform charging interaction on the first session with the user plane entity of the gateway, and is specifically configured to: determine quota usage information by using the first usage quota; and perform charging interaction on the first session with the user plane entity of the gateway device according to the quota usage information; where the third processor is further configured to allocate a second usage quota to the service; or according to the quota usage information, perform charging interaction on the first session with the user plane entity of the gateway device, deactivate the first session, and perform interaction on the second session with the control plane entity of the gateway device, so as to deactivate the second session.

With reference to the eleventh aspect of the present disclosure, or the first to the seventh implementable manners of the eleventh aspect of the present disclosure, in an eighth implementable manner, the service identifier includes at least one of the following: an IMSI of user equipment, an identifier of the second session, a hash value of an IMSI of user equipment, an establishing moment of the second session, or a random number.

Technical effects of the present disclosure are: A first session is established between an OCS and a user plane of a gateway device by using a service identifier, so that direct interaction between the user plane of the gateway device and the OCS is implemented, and a technical problem that a gateway device in a decoupled architecture has an extremely long charging path and a large charging delay is resolved.

BRIEF DESCRIPTION OF DRAWINGS

To describe the technical solutions in the embodiments of the present disclosure, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

FIG. 1 is a flowchart of Embodiment 1 of an online charging method according to the present disclosure;

FIG. 2 is a flowchart of Embodiment 3 of an online charging method according to the present disclosure;

FIG. 3 is a flowchart of Embodiment 5 of an online charging method according to the present disclosure;

DESCRIPTION OF EMBODIMENTS

Figure 4:
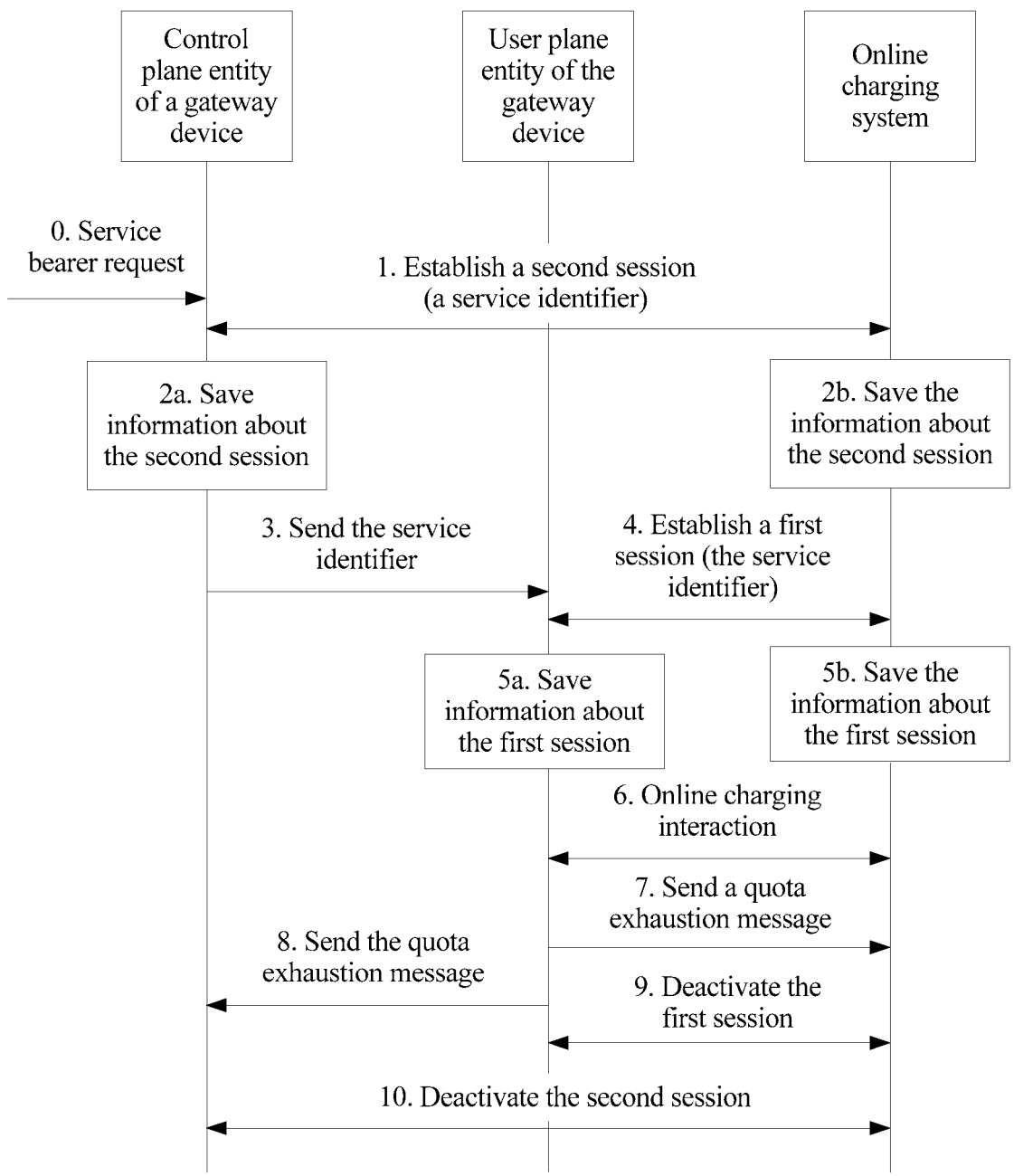
FIG. 4 is a signaling flowchart of Embodiment 7 of an online charging method according to the present disclosure.

To make the objectives, technical solutions, and advantages of the embodiments of the present disclosure clearer, the following describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

FIG. 1 is a flowchart of Embodiment 1 of an online charging method according to the present disclosure. As shown in FIG. 1, the method in this embodiment may include:

Step 101: A control plane entity of a gateway device sends a service identifier to a user plane entity of the gateway device, where the service identifier is used by the user plane entity of the gateway device to interact with an OCS according to the service identifier, so as to establish a first session associated with the service and perform charging interaction on the first session, and the first session is a session between the user plane entity of the gateway device and the OCS.

Specifically, before step 101, the method further includes: receiving, by the control plane entity of the gateway device, a service request sent by a user; and after the control plane entity of the gateway device receives the service request sent by the user, interacting, by the control plane entity of the gateway device, with the OCS, establishing a second session based on the service in that process, and determining the service identifier for the service in the process. The service identifier is used to uniquely identify the service.

A person skilled in the art may understand that the second session is only used to transmit a related message of the service between the control plane entity of the gateway device and the OCS, and is not used to transmit a related message of another service. When a related message of another service needs to be transmitted between the control plane entity of the gateway device and the OCS, the control plane entity of the gateway device and the OCS establish another session for the another service, where the another session is different from the second session.

After obtaining the service identifier, the control plane entity of the gateway device sends the service identifier to the user plane entity of the gateway device, so that the user plane entity of the gateway device obtains the service identifier. After the user plane entity of the gateway device obtains the service identifier, the user plane entity of the gateway device and the OCS establish, based on the same service identifier, the first session for the service, thereby establishing the session between the user plane entity of the gateway device and the OCS. In a subsequent charging control process, the related message of the service may be directly transmitted on the established first session between the user plane entity of the gateway device and the OCS, and does not need to be forwarded by the control plane entity of the gateway device.

More specifically, interaction between the control plane entity of the gateway device and the OCS may be performed by using a (CCR) message/(CCA) message. In addition, the service identifier may be allocated by the control plane entity of the gateway device to the service, or may be allocated by the OCS to the service. That is, if the control plane entity of the gateway device allocates the service identifier to the service, the control plane entity of the gateway device sends a CCR carrying the service identifier to the OCS; or if the OCS allocates the service identifier to the service, the OCS sends a CCA carrying the service identifier to the control plane entity of the gateway device, and the control plane entity of the gateway device receives the CCA to obtain the service identifier, which is not limited in this embodiment.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment. It should be noted that the service identifier may be preset to be represented by the IMSI of the device or the like, or whether the service identifier is to be represented by the IMSI of the device or the like may be negotiated in a process of interaction between the control plane entity of the gateway device and the OCS.

In this embodiment, a service identifier is determined for a service, and a first session is established between an OCS and a user plane of a gateway device according to the service identifier, so that direct interaction between the user plane of the gateway device and the OCS is implemented, and a technical problem that a gateway device in a decoupled architecture has an extremely long charging path and a large charging delay is resolved.

The following uses a specific embodiment to describe in detail the technical solution in the method embodiment shown in FIG. 1.

Embodiment 2 of an online charging method according to the present disclosure is based on Embodiment 1 of the online charging method according to the present disclosure. Further, in the process in which the control plane of the gateway device interacts with the OCS so as to establish the second session and determine the service identifier, the OCS further allocates a first usage quota to the service.

Specifically, monitoring on a usage quota may be executed by the user plane entity of the gateway device or the OCS. When the user plane entity of the gateway device executes monitoring on a usage quota, the OCS may send a CCA carrying information about the allocated first usage quota to the control plane entity of the gateway device, the control plane entity of the gateway device forwards the information about the first usage quota to the user plane of the gateway device, and the user plane of the gateway device determines quota usage information according to the information about the first usage quota. When the OCS executes monitoring on a usage quota, the OCS does not need to send the allocated first usage quota to the control plane entity of the gateway device by using a CCA; instead, the OCS monitors usage information of the usage quota for the service directly according to the first usage quota allocated to the service.

Specifically, when the user plane entity of the gateway device determines that the usage quota is to be exhausted, the user plane entity of the gateway device may apply to the OCS for a second usage quota; or may separately send a quota exhaustion message to the control plane entity of the gateway device and the OCS after determining that the usage quota is exhausted, so that the control plane entity of the gateway device interacts with the OCS so as to execute an operation of deactivating the second session, and the user plane entity of the gateway device also interacts with the OCS so as to execute operations of fee deduction and deactivating the first session. A person skilled in the art may understand that when the second usage quota is to be exhausted, a third usage quota, a fourth usage quota, or the like may be further applied.

When the OCS determines that the first usage quota is to be exhausted, the OCS may allocate a second usage quota to the service; or may send a quota exhaustion message to the control plane entity of the gateway device after determining that the usage quota is exhausted, so that the control plane entity of the gateway device interacts with the OCS so as to execute an operation of deactivating the second session, and the user plane entity of the gateway device also interacts with the OCS so as to execute operations of fee deduction and deactivating the first session. A person skilled in the art may understand that when the second usage quota is to be exhausted, a third usage quota, a fourth usage quota, or the like may be further applied.

In this embodiment, before a service is provided for a user, an OCS allocates a usage quota to the user according to a prepayment of the user, and controls service usage of the user according to the allocated usage quota, which may effectively avoid a case of malicious arrears, and improve manageability of online charging.

FIG. 2 is a flowchart of Embodiment 3 of an online charging method according to the present disclosure. As shown in FIG. 2, the method in this embodiment may include:

Step 201: A user plane entity of a gateway device receives a service identifier sent by a control plane entity of the gateway device.

Specifically, to obtain a service bearer, a user first sends a service request to the control plane entity of the gateway device. After receiving the service request, the control plane entity of the gateway device interacts with an OCS. In the interaction process, a first usage quota and a service identifier are allocated to the service request, and a second session between the control plane entity of the gateway device and the OCS is established for the service request. A person skilled in the art may understand that the control plane entity of the gateway device may interact with the OCS by using any suitable protocol, as long as the allocated service identifier is carried in the interaction process. The service identifier may be allocated by the control plane entity of the gateway device, or may be allocated by the OCS. After obtaining the service identifier for the service, the control plane entity of the gateway device sends the service identifier to the user plane entity of the gateway device. The user plane entity of the gateway device executes an operation of receiving the service identifier sent by the control plane entity of the gateway device. Any suitable interaction between the control plane entity of the gateway device and the user plane entity of the gateway device may be implemented.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment.

Step 202: The user plane entity of the gateway device establishes a first session, which is associated with the service, with the OCS by using the service identifier.

Specifically, after receiving the service identifier, the user plane entity of the gateway device interacts with the OCS according to the service identifier. The OCS may also obtain the service identifier for the service. Therefore, after the OCS receives a message that is sent by the user plane entity of the gateway device and that carries the service identifier, the OCS may learn which service that the current interaction with the user plane entity of the gateway device is specific to.

More specifically, interaction between the user plane entity of the gateway device and the OCS may also use any suitable protocol of interaction between the control plane entity of the gateway device and the OCS. That is, the interaction is performed by using a CCR/CCA. In a process of interaction between the user plane entity of the gateway device and the OCS, the first session between the user plane entity of the gateway device and the OCS is established for the service.

Preferably, the user plane entity of the gateway device and the OCS locally store information related to the first session separately.

Step 203: The user plane entity of the gateway device performs charging interaction on the first session with the OCS.

Specifically, after the first session between the user plane entity of the gateway device and the OCS is established, service information of the service, such as actual usage of the service, geographic information about where the user uses the service, and quality of service (QoS) of the service, may be directly transmitted between the user plane entity of the gateway device and the OCS by using the first session, without requiring the control plane entity of the gateway device to forward the information.

In this embodiment, a service identifier is determined for a service, and a first session is established between an OCS and a user plane of a gateway device according to the service identifier, so that direct interaction between the user plane of the gateway device and the OCS is implemented, and a technical problem that a gateway device in a decoupled architecture has an extremely long charging path and a large charging delay is resolved.

The following uses a specific embodiment to describe in detail the technical solution in the method embodiment shown in FIG. 2.

Embodiment 4 of an online charging method according to the present disclosure is based on Embodiment 3 of the online charging method according to the present disclosure. Further, in the process in which the control plane of the gateway device interacts with the OCS so as to establish the second session and determine the service identifier, the OCS further allocates a first usage quota to the service.

Specifically, monitoring on a usage quota may be executed by the user plane entity of the gateway device or the OCS. When the user plane entity of the gateway device executes monitoring on a usage quota, before the user plane entity of the gateway device performs charging interaction on the first session with the OCS, the OCS may send a CCA carrying information about the allocated first usage quota to the control plane entity of the gateway device, the control plane entity of the gateway device forwards the message of the first usage quota to the user plane of the gateway device, and the user plane of the gateway device determines quota usage information according to the message of the first usage quota. Alternatively, when the OCS executes monitoring on a usage quota, before the user plane entity of the gateway device performs charging interaction on the first session with the OCS, the OCS does not need to send the allocated first usage quota to the control plane entity of the gateway device by using a CCA; instead, the OCS monitors usage information of the usage quota for the service directly according to the first usage quota allocated to the service.

Specifically, when the user plane entity of the gateway device determines that the usage quota is to be exhausted, the user plane entity of the gateway device may apply on the first session to the OCS for a second usage quota; or may separately send a quota exhaustion message to the control plane entity of the gateway device and the OCS after determining that the usage quota is exhausted, so that the control plane entity of the gateway device interacts with the OCS so as to execute an operation of deactivating the second session, and the user plane entity of the gateway device also interacts with the OCS so as to execute operations of fee deduction and deactivating the first session. A person skilled in the art may understand that when the second usage quota is to be exhausted, a third usage quota, a fourth usage quota, or the like may be further applied.

When the OCS determines that the usage quota is to be exhausted, the OCS may allocate a second usage quota to the service; or may send a quota exhaustion message to the control plane entity of the gateway device after determining that the usage quota is exhausted, so that the control plane entity of the gateway device interacts with the OCS so as to execute an operation of deactivating the second session, and the user plane entity of the gateway device also interacts with the OCS so as to execute operations of fee deduction and deactivating the first session. A person skilled in the art may understand that when the second usage quota is to be exhausted, a third usage quota, a fourth usage quota, or the like may be further applied.

In this embodiment, before a service bearer is provided for a user, an OCS allocates a usage quota to the user according to a prepayment of the user, and controls service usage of the user according to the allocated usage quota, which may effectively avoid a case of malicious arrears, and improve manageability of online charging.

FIG. 3 is a flowchart of Embodiment 5 of an online charging method according to the present disclosure. As shown in FIG. 3, the method in this embodiment may include:

Step 301: An OCS interacts with a user plane entity of a gateway by using a service identifier, so as to establish a first session associated with a service requested by a user.

Specifically, to obtain a service bearer, the user first sends a service request to a control plane entity of the gateway device. After receiving the service request, the control plane entity of the gateway device interacts with the OCS. In this process, the OCS executes an operation of interacting with the control plane entity of the gateway device. During the interaction, the OCS and the control plane entity of the gateway device establish a second session for the service, and determine the service identifier. The service identifier is used to uniquely identify the service.

A person skilled in the art may understand that the second session is only used to transmit a related message of the service between the control plane entity of the gateway device and the OCS, and is not used to transmit a related message of another service. When a related message of another service needs to be transmitted between the control plane entity of the gateway device and the OCS, the control plane entity of the gateway device and the OCS establish another session for the another service, where the another session is different from the second session. In addition, after obtaining the service identifier, the control plane entity of the gateway device further sends the service identifier to the user plane entity of the gateway device, so that the user plane entity of the gateway obtains the service identifier.

More specifically, interaction between the OCS and the control plane entity of the gateway device may be performed by using a CCR/CCA. In addition, the service identifier may be allocated by the control plane entity of the gateway device to the service, or may be allocated by the OCS to the service. That is, if the control plane entity of the gateway device allocates the service identifier to the service, the control plane entity of the gateway device sends a CCR carrying the service identifier to the OCS; or if the OCS allocates the service identifier to the service, the OCS sends a CCA carrying the service identifier to the OCS, and the control plane entity of the gateway device receives the CCA to obtain the service identifier, which is not limited in this embodiment.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment. It should be noted that the service identifier may be preset to be represented by the IMSI of the device or the like, or whether the service identifier is to be represented by the IMSI of the device or the like may be negotiated in a process of interaction between the control plane entity of the gateway device and the OCS.

Specifically, after the user plane entity of the gateway device obtains the service identifier, the OCS interacts with the user plane entity of the gateway device according to the service identifier. That is, the service identifier for the service is carried in a message transmitted in the interaction process. By means of the current interaction, the OCS and the user plane entity of the gateway device establish the first session for the service.

Step 302: The OCS performs charging interaction on the first session with the user plane entity of the gateway.

Specifically, after the first session is established, a message related to the service may be transmitted on the first session between the OCS and the user plane entity of the gateway device, so that the OCS collects statistics about service usage information, and executes a fee deduction operation. The first session is a dedicated session for the message, and therefore no service identifier needs to be carried when information is transmitted on the first session. The information may include but is not limited to: actual usage of the service, geographic information about where the user uses the service, QoS of the service, and the like.

In this embodiment, before a service bearer is provided for a user, an OCS allocates a usage quota to the user according to a prepayment of the user, and controls service usage of the user according to the allocated usage quota, which may effectively avoid a case of malicious arrears, and improve manageability of online charging.

The following uses a specific embodiment to describe in detail the technical solution in the method embodiment shown in FIG. 3.

Embodiment 6 of an online charging method according to the present disclosure is based on Embodiment 5 of the online charging method according to the present disclosure. Further, in the process in which the control plane of the gateway device interacts with the OCS so as to establish the second session and determine the service identifier, the OCS further allocates a first usage quota to the service.

Specifically, monitoring on the first usage quota may be executed by the user plane entity of the gateway device or the OCS. When the user plane entity of the gateway device executes monitoring on the first usage quota, before the user plane entity of the gateway device performs charging interaction on the first session with the OCS, the OCS may send a CCA carrying information about the allocated first usage quota to the control plane entity of the gateway device, the control plane entity of the gateway device forwards the information about the first usage quota to the user plane of the gateway device, and the user plane of the gateway device determines quota usage information according to the message of the first usage quota. Alternatively, when the OCS executes monitoring on the first usage quota, before the user plane entity of the gateway device performs charging interaction on the first session with the OCS, the OCS does not need to send the allocated first usage quota to the control plane entity of the gateway device by using a CCA; instead, the OCS monitors usage information of the first usage quota for the service directly according to the first usage quota allocated to the service.

Specifically, when the user plane entity of the gateway device determines that the usage quota is to be exhausted, the user plane entity of the gateway device may apply on the first session to the OCS for a second usage quota; or may separately send a quota exhaustion message to the control plane entity of the gateway device and the OCS after determining that the usage quota is exhausted, so that the control plane entity of the gateway device interacts with the OCS so as to execute an operation of deactivating the second session, and the user plane entity of the gateway device also interacts with the OCS so as to execute operations of fee deduction and deactivating the first session. A person skilled in the art may understand that when the second usage quota is to be exhausted, a third usage quota, a fourth usage quota, or the like may be further applied.

When the OCS determines that the first usage quota is to be exhausted, the OCS may allocate a second usage quota to the service; or may send a quota exhaustion message to the control plane entity of the gateway device after determining that the usage quota is exhausted, so that the control plane entity of the gateway device interacts with the OCS so as to execute an operation of deactivating the second session, and the user plane entity of the gateway device also interacts with the OCS so as to execute operations of fee deduction and deactivating the first session.

Preferably, after allocating a usage quota to the service, the OCS further executes an operation of withholding a charge.

In this embodiment, before a service bearer is provided for a user, an OCS allocates a usage quota to the user according to a prepayment of the user, and controls service usage of the user according to the allocated usage quota, which may effectively avoid a case of malicious arrears, and improve manageability of online charging.

FIG. 4 is a signaling flowchart of Embodiment 7 of an online charging method according to the present disclosure. As shown in FIG. 4, the method in this embodiment may include:

Step 0: A user sends a service bearer request to a control plane entity of a gateway device.

Step 1: The control plane entity of the gateway device interacts with an OCS.

Specifically, after receiving the service bearer request sent by the user, the control plane entity of the gateway device sends a CCR to the OCS. The CCR carries geographic information about where the user uses a service, QoS of the service, and the like. After receiving the CCR, the OCS replies a CCA to the control plane entity of the gateway device, thereby establishing a second session. The CCA carries an allocated first usage quota, and the OCS withholds a charge.

More specifically, a service identifier is further allocated to the service in a process in which the control plane entity of the gateway device interacts with the OCS. The service identifier may be allocated by the control plane entity of the gateway device and sent to the OCS by using a CCR; or the service identifier may be allocated by the OCS and sent to the control plane entity of the gateway device by using a CCA.

More specifically, the service identifier may be an IMSI of a device, may be an identifier of the second session, may be a combination of an IMSI of a device and an identifier of the second session, or may be a random sequence, which is not limited in this embodiment.

Step 2a: The control plane entity of the gateway device saves information about a second session.

Step 2b: The OCS saves the information about the second session.

A person skilled in the art may understand that an execution order of step 2a and step 2b is not limited in this embodiment. That is, step 2a may be performed before step 2b, or step 2b may be performed before step 2a, or step 2a and step 2b may be performed at the same time.

Step 3: The control plane entity of the gateway device sends a service identifier and a first usage quota to a user plane entity of the gateway device.

Specifically, a message sent by the control plane entity of the gateway device to the user plane entity of the gateway device additionally carries the service identifier and the first usage quota. Alternatively, the first usage quota has been carried in other approaches, and therefore only the service identifier needs to be additionally carried. In addition, the user plane entity of the gateway device is instructed to establish a first session with the OCS based on the service identifier.

Preferably, after receiving the message sent by the control plane entity of the gateway device, the user plane entity of the gateway device further returns an acknowledgement message to the control plane entity of the gateway device, and this step is not shown in the figure.

Step 4: Based on the service identifier, the user plane entity of the gateway device interacts with the OCS so as to establish a first session for the service.

Specifically, a CCR/CCA may also be used when interaction between the user plane entity of the gateway device and the OCS is performed.

Step 5a: The user plane entity of the gateway device saves information about the first session.

Step 5b: The OCS saves the information about the first session.

A person skilled in the art may understand that an execution order of step 5a and step 5b is not limited in this embodiment. That is, step 5a may be performed before step 5b, or step 5b may be performed before step 5a, or step 5a and step 5b may be performed at the same time.

Step 6: The user plane entity of the gateway device and the OCS perform a charging control process on the established first session.

Specifically, the charging control process includes: when the user plane entity of the gateway device detects, according to the first usage quota, that the usage quota is to be exhausted, the user plane entity of the gateway device applies to the OCS for a second usage quota. The OCS determines, according to a prepayment of the user, whether the second usage quota can be further allocated, and if the second usage quota can be further allocated, allocates the second usage quota, withholds a charge for the second usage quota, and sends information about the allocated second usage quota to the user plane entity of the gateway device. Alternatively, whether the second usage quota can be further allocated is determined according to a prepayment of the user, and if the second usage quota cannot be further allocated, that is, when an account balance is insufficient, the second usage quota is not further allocated to the user. After determining that the usage quota is exhausted, the OCS deducts a charge for the first usage quota.

Step 7: The user plane entity of the gateway device sends a quota exhaustion message to the OCS.

Step 8: The user plane entity of the gateway device sends a quota exhaustion message to the control plane entity of the gateway device.

A person skilled in the art may understand that an execution order of step 7 and step 8 is not limited in this embodiment. That is, step 7 may be performed before step 8, or step 8 may be performed before step 7, or step 7 and step 8 may be performed at the same time.

Step 9: The user plane entity of the gateway device interacts with the OCS so as to deactivate the first session.

Optionally, after the user plane entity of the gateway device sends the quota exhaustion message to the OCS, the user plane entity of the gateway device may initiate an interaction process of deactivating the first session.

That the user plane entity of the gateway device interacts with the OCS so as to deactivate the first session further includes: The user plane entity of the gateway device and the OCS separately deactivate the locally stored information about the first session.

Step 10: The control plane entity of the gateway device interacts with the OCS so as to deactivate the second session.

Specifically, that the control plane entity of the gateway device interacts with the OCS so as to deactivate the second session further includes: The control plane entity of the gateway device and the OCS separately deactivate the locally stored information about the second session.

A person skilled in the art may understand that an execution order of step 9 and step 10 is not limited in this embodiment. That is, step 9 may be performed before step 10, or step 10 may be performed before step 9, or step 9 and step 10 may be performed at the same time.

In this embodiment, before a service bearer is provided for a user, an OCS allocates a usage quota to the user according to a prepayment of the user, and controls service usage of the user according to the allocated usage quota, which may effectively avoid a case of malicious arrears, and improve manageability of online charging. In addition, before the service bearer is provided for the user, the OCS allocates the usage quota to the user according to the prepayment of the user, and controls the service usage of the user according to the allocated usage quota, which may effectively avoid the case of malicious arrears, and improve manageability of online charging.

Figure 5:
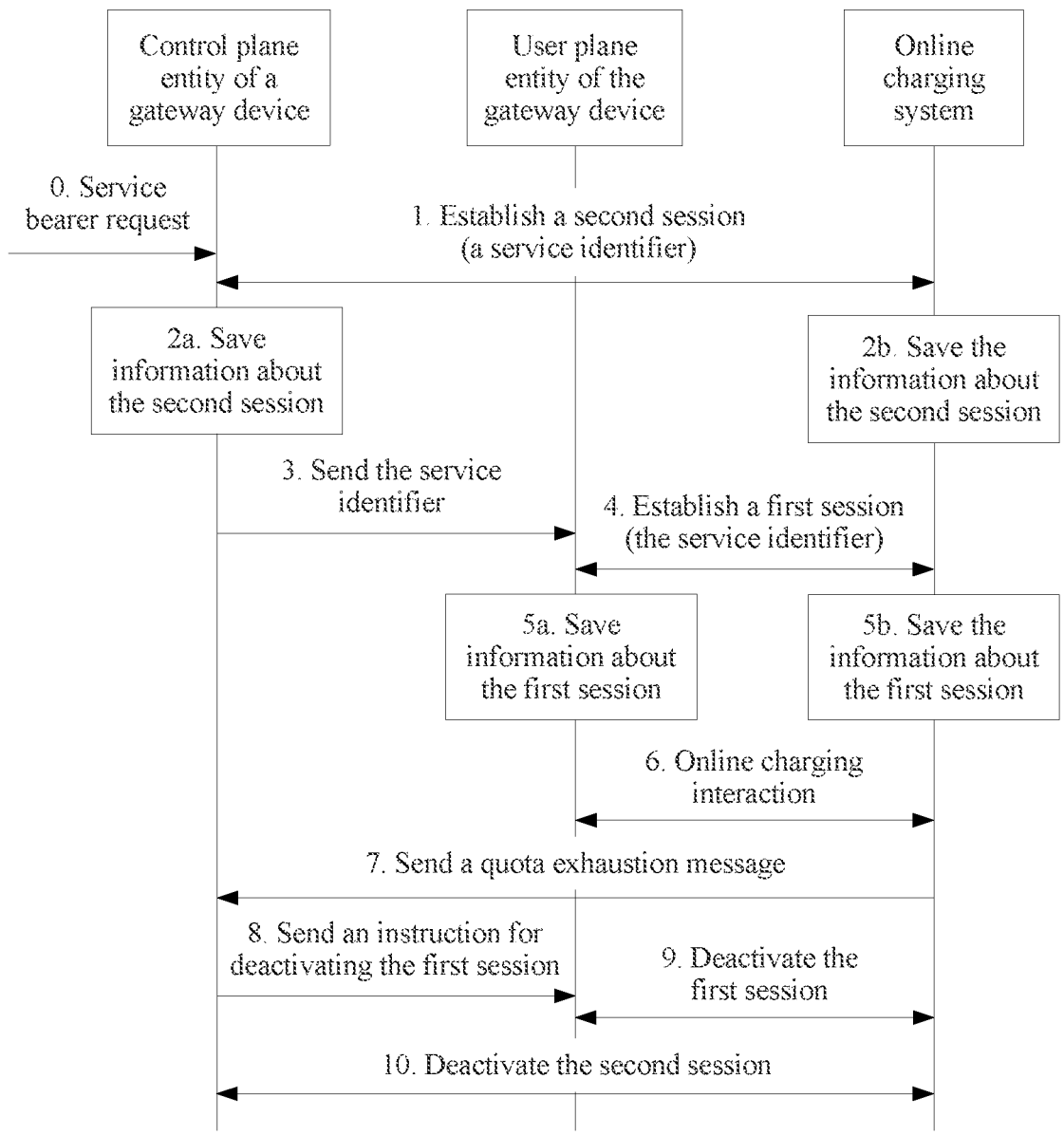
FIG. 5 is a signaling flowchart of Embodiment 8 of an online charging method according to the present disclosure.

FIG. 5 is a signaling flowchart of Embodiment 8 of an online charging method according to the present disclosure. As shown in FIG. 5, the method in this embodiment may include:

Step 0: A user sends a service bearer request to a control plane entity of a gateway device.

Step 1: The control plane entity of the gateway device interacts with an OCS.

Specifically, after receiving the service bearer request sent by the user, the control plane entity of the gateway device sends a CCR to the OCS. The CCR carries geographic information about where the user uses a service, QoS of the service, and the like. After receiving the CCR, the OCS replies a CCA to the control plane entity of the gateway device, thereby establishing a second session. In addition, the OCS allocates a first usage quota to the service.

It should be noted that a difference between Embodiment 8 of the present disclosure and Embodiment 7 of the present disclosure is that the OCS monitors usage information of a usage quota for the service in this embodiment. Therefore, in this embodiment, it is not required to send the first usage quota to the control plane entity of the gateway device by using a CCA, and then send information about the first usage quota to a user plane entity of the gateway device by using the control plane entity of the gateway device.

More specifically, a service identifier is further allocated to the service in a process in which the control plane entity of the gateway device interacts with the OCS. The service identifier may be allocated by the control plane entity of the gateway device and sent to the OCS by using a CCR; or the service identifier may be allocated by the OCS and sent to the control plane entity of the gateway device by using a CCA.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment.

Step 2a: The control plane entity of the gateway device saves information about a second session.

Step 2b: The OCS saves the information about the second session.

A person skilled in the art may understand that an execution order of step 2a and step 2b is not limited in this embodiment. That is, step 2a may be performed before step 2b, or step 2b may be performed before step 2a, or step 2a and step 2b may be performed at the same time.

Step 3: The control plane entity of the gateway device sends a service identifier to a user plane entity of the gateway device.

Specifically, this step is the same as step 3 in Embodiment 7, and details are not described herein again.

Step 4: Based on the service identifier, the user plane entity of the gateway device and the OCS establish a first session for the service.

Specifically, a CCR/CCA may also be used when interaction between the user plane entity of the gateway device and the OCS is performed.

Step 5a: The user plane entity of the gateway device saves information about the first session.

Step 5b: The OCS saves the information about the first session.

A person skilled in the art may understand that an execution order of step 5a and step 5b is not limited in this embodiment. That is, step 5a may be performed before step 5b, or step 5b may be performed before step 5a, or step 5a and step 5b may be performed at the same time.

Step 6: The user plane entity of the gateway device and the OCS perform a charging control process on the established first session.

Specifically, the charging control process includes: When detecting, according to the first usage quota, that the usage quota is to be exhausted, the OCS determines, according to a prepayment of the user, whether a second usage quota can be further allocated, and if the second usage quota can be further allocated, allocates the second usage quota, withholds a charge for the second usage quota, and continues to monitor, for the allocated second usage quota, usage information of the second usage quota for the service. Alternatively, whether a second usage quota can be further allocated is determined according to a prepayment of the user, and if the second usage quota cannot be further allocated, that is, when an account balance is insufficient, the second usage quota is not further allocated to the user. When determining that the first usage quota is exhausted, OCS deducts a charge for the first usage quota.

Step 7: The OCS sends a quota exhaustion message to the control plane entity of the gateway device.

Step 8: The control plane entity of the gateway device sends an instruction for deactivating the first session to the user plane entity of the gateway device.

Specifically, after receiving the quota exhaustion message sent by the OCS, the control plane entity of the gateway device may send the instruction for deactivating the first session to the user plane entity of the gateway device, so that the user plane entity of the gateway device interacts with the OCS so as to deactivate the first session.

Preferably, after receiving the instruction sent by the control plane entity of the gateway device, the user plane entity of the gateway device further returns an acknowledgement message to the control plane entity of the gateway device, and this step is not shown in the figure.

Step 9: The user plane entity of the gateway device interacts with the OCS so as to deactivate the first session.

Specifically, that the user plane entity of the gateway device interacts with the OCS so as to deactivate the first session further includes: The user plane entity of the gateway device and the OCS separately deactivate the locally stored information about the first session.

Step 10: The control plane entity of the gateway device interacts with the OCS so as to deactivate the second session.

Specifically, that the control plane entity of the gateway device interacts with the OCS so as to deactivate the second session further includes: The control plane entity of the gateway device and the OCS separately deactivate the locally stored information about the second session.

A person skilled in the art may understand that an execution order of step 9 and step 10 is not limited in this embodiment. That is, step 9 may be performed before step 10, or step 10 may be performed before step 9, or step 9 and step 10 may be performed at the same time.

In this embodiment, before a service bearer is provided for a user, an OCS allocates a usage quota to the user according to a prepayment of the user, and controls service usage of the user according to the allocated usage quota, which may effectively avoid a case of malicious arrears, and improve manageability of online charging. In addition, before the service bearer is provided for the user, the OCS allocates the usage quota to the user according to the prepayment of the user, and controls the service usage of the user according to the allocated usage quota, which may effectively avoid the case of malicious arrears, and improve manageability of online charging.

Figure 6:
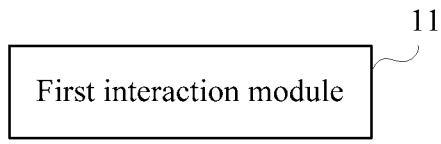
FIG. 6 is a schematic structural diagram of Embodiment 1 of a control plane device of a gateway device according to the present disclosure.

FIG. 6 is a schematic structural diagram of Embodiment 1 of a control plane device of a gateway device according to the present disclosure. As shown in FIG. 6, the control plane device of the gateway device in this embodiment may include: a first interaction module 11.

The first interaction module 11 is configured to send a service identifier to a user plane entity of the gateway device, where the service identifier is used by the user plane entity of the gateway device to interact with an OCS according to the service identifier, so as to establish a first session associated with the service and perform charging interaction on the first session, and the first session is a session between the user plane entity of the gateway device and the OCS.

Figure 7:
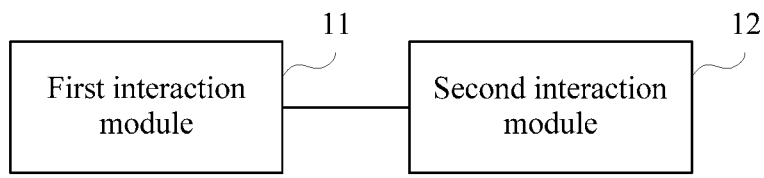
FIG. 7 is a schematic structural diagram of Embodiment 2 of a control plane device of a gateway device according to the present disclosure.

Further, as shown in FIG. 7, the device further includes: a second interaction module 12.

The second interaction module 12 is configured to: before the first interaction module sends the service identifier to the user plane entity of the gateway device, interact with the OCS, so as to establish a second session associated with the service requested by a user and determine the service identifier of the service, where the second session is a session between a control plane entity of the gateway device and the OCS.

Specifically, the second interaction module 12 is further configured to: send a CCR message to the OCS, where the CCR message includes the service identifier, which is allocated by the control plane entity of the gateway device, of the service; and receive a CCA message sent by the OCS, thereby establishing the second session of the service.

Alternatively, the second interaction module 12 is further configured to: send a CCR message to the OCS; and receive a CCA message sent by the OCS, where the CCA message includes the service identifier, which is allocated by the OCS, of the service, thereby establishing the second session of the service.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment.

The control plane device of the gateway device in this embodiment may be configured to execute the technical solution in the method embodiment shown in FIG. 1. Implementation principles and technical effects are similar, and details are not described herein again.

Embodiment 2 of a control plane device of a gateway device according to the present disclosure is based on Embodiment 1 of the control plane device of the gateway device according to the present disclosure. Further, the CCA message further includes information about a first usage quota.

After the second interaction module 12 receives the CCA message sent by the OCS, the first interaction module 11 is further configured to: send the information about the first usage quota to the user plane entity of the gateway device, so that the user plane entity of the gateway device performs charging interaction on the first session with the OCS according to the information about the first usage quota.

The second interaction module 12 is further configured to receive a quota exhaustion message sent on the second session by the OCS, and deactivate the second session with the OCS.

Alternatively, the first interaction module 11 is further configured to receive a quota exhaustion message sent by the user plane entity of the gateway device.

The control plane device of the gateway device in this embodiment may be configured to execute the technical solution in Embodiment 2 of the online charging method. Implementation principles and technical effects are similar, and details are not described herein again.

Figure 8:
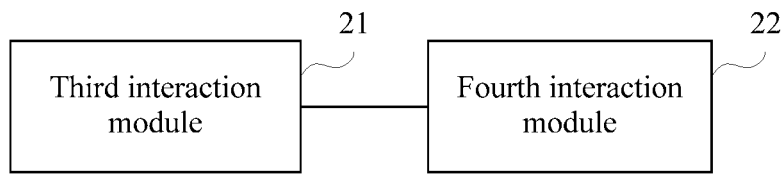
FIG. 8 is a schematic structural diagram of Embodiment 1 of a user plane device of a gateway device according to the present disclosure.

FIG. 8 is a schematic structural diagram of Embodiment 1 of a user plane device of a gateway device according to the present disclosure. As shown in FIG. 8, the user plane device of the gateway device in this embodiment may include: a third interaction module 21 and a fourth interaction module 22.

The third interaction module 21 is configured to receive a service identifier sent by a control plane entity of the gateway device.

The fourth interaction module 22 is configured to interact with an OCS by using the service identifier, so as to establish a first session of the service, and perform charging interaction on the first session with the OCS.

More specifically, the service identifier may be an IMSI of a device, may be an identifier of a second session, may be a hash value of an IMSI of a device, may be an establishing moment of a second session, may be a random number, or may be a combination of any item of the foregoing, which is not limited in this embodiment.

The user plane device of the gateway device in this embodiment may be configured to execute the technical solution in the method embodiment shown in FIG. 2. Implementation principles and technical effects are similar, and details are not described herein again.

Embodiment 2 of a user plane device of a gateway device according to the present disclosure is based on Embodiment 1 of the user plane device of the gateway device according to the present disclosure. Further, the third interaction module 21 is further configured to receive information about a first usage quota sent by the control plane entity of the gateway device, and is further configured to send a quota exhaustion message to the control plane entity of the gateway device.

The fourth interaction module 22 is further configured to perform charging interaction with the OCS by using the information about the first usage quota, and determine quota usage information by using the first usage quota; and according to the quota usage information, perform charging interaction on the first session with the OCS, and receive a second usage quota that is allocated by the OCS to the service; or according to the quota usage information, perform charging interaction on the first session with the OCS, deactivate the first session, and send a quota exhaustion message to the OCS.

The third interaction module 21 is further configured to send the quota exhaustion message to the control plane entity of the gateway device.

The fourth interaction module 22 is specifically configured to perform charging interaction on the first session with the OCS; or perform charging interaction on the first session with the OCS so as to deactivate the first session.

The user plane device of the gateway device in this embodiment may be configured to execute the technical solution in Embodiment 4 of the online charging method. Implementation principles and technical effects are similar, and details are not described herein again.

Figure 9:
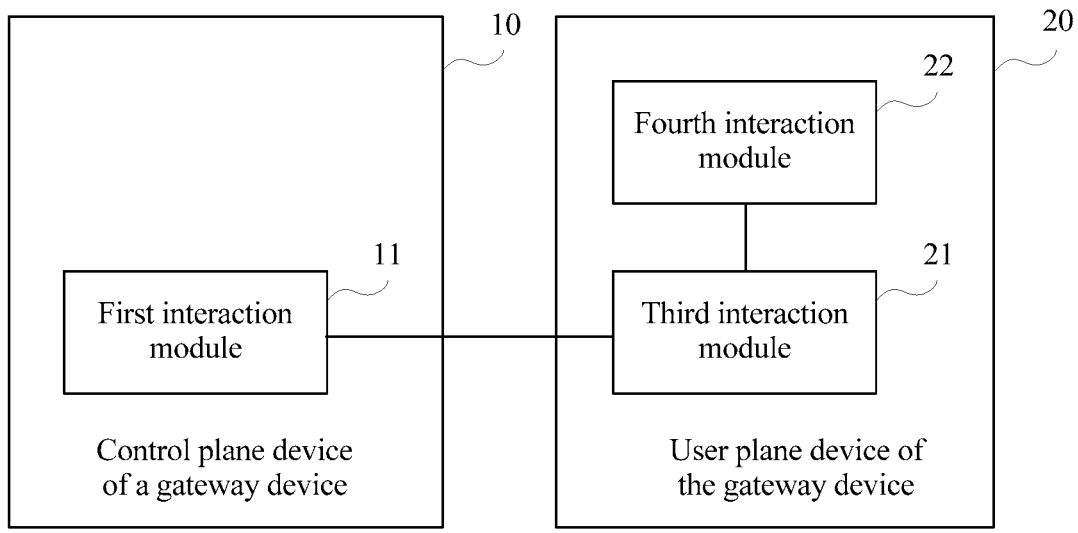
FIG. 9 is a schematic structural diagram of Embodiment 1 of a gateway device according to the present disclosure.

FIG. 9 is a schematic structural diagram of Embodiment 1 of a gateway device according to the present disclosure. As shown in FIG. 9, the gateway device in this embodiment may include: a control plane device 10 of the gateway device and a user plane device 20 of the gateway device.

The control plane device 10 of the gateway device includes: a first interaction module 11.

The user plane device 20 of the gateway device includes: a third interaction module 21 and a fourth interaction module 22.

Specifically, a function of the first interaction module 11 is the same as that in Embodiment 1 or Embodiment 2 of the control plane device of the gateway device, a function of the third interaction module 21 or the fourth interaction module 22 is the same as that in Embodiment 1 or Embodiment 2 of the user plane device of the gateway device, and details are not described herein again.

The gateway device in this embodiment may be configured to execute the technical solutions in Embodiment 1, Embodiment 2, Embodiment 3, and Embodiment 4 of the online charging method. Implementation principles and technical effects are similar, and details are not described herein again.

Figure 10:
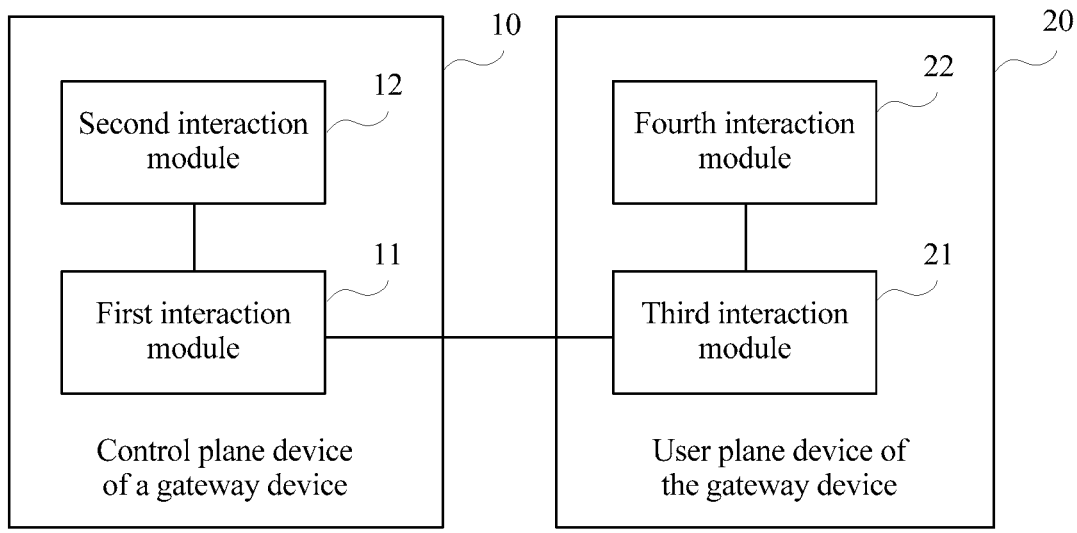
FIG. 10 is a schematic structural diagram of Embodiment 2 of a gateway device according to the present disclosure.

Further, as shown in FIG. 10, the control plane device 10 of the gateway device includes: a second interaction module 12.

A function of the second interaction module 12 is the same as that in the foregoing method embodiment, and details are not described herein again.

Figure 11:
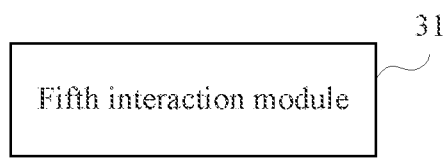
FIG. 11 is a schematic structural diagram of Embodiment 1 of an online charging device according to the present disclosure.

FIG. 11 is a schematic structural diagram of Embodiment 1 of an online charging device according to the present disclosure. As shown in FIG. 11, the online charging device in this embodiment may include: a fifth interaction module 31.

The fifth interaction module 31 is configured to interact with a user plane entity of a gateway, so as to establish a first session associated with a service requested by a user, and perform charging interaction on the first session with the user plane entity of the gateway.

The online charging device in this embodiment may be configured to execute the technical solution of the online charging method in FIG. 3. Implementation principles and technical effects are similar, and details are not described herein again.

Figure 12:
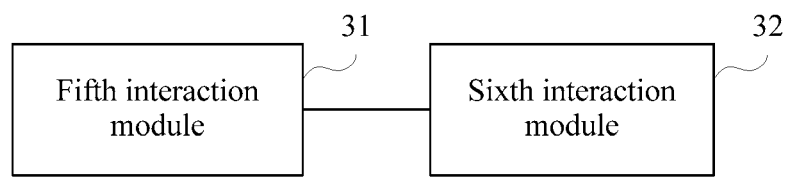
FIG. 12 is a schematic structural diagram of Embodiment 2 of an online charging device according to the present disclosure.

FIG. 12 is a schematic structural diagram of Embodiment 2 of an online charging device according to the present disclosure. As shown in FIG. 12, the online charging device in this embodiment may include: a fifth interaction module 31 and a sixth interaction module 32.

The sixth interaction module 32 is configured to interact with a control plane entity of a gateway device, so as to establish a second session of a service requested by a user and determine a service identifier of the service, where the second session is a session between the control plane entity of the gateway device and an OCS, so that the control plane entity of the gateway device sends the service identifier to a user plane entity of the gateway device.

The fifth interaction module 31 is configured to interact with the user plane entity of the gateway, so as to establish a first session of the service, and perform charging interaction on the first session with the user plane entity of the gateway.

Specifically, the sixth interaction module 32 is further configured to: receive a CCR message sent by the control plane entity of the gateway device, where the CCR message includes the service identifier, which is allocated by the control plane entity of the gateway device, of the service, and the control plane entity of the gateway sends the service identifier to the user plane entity of the gateway device; and send a CCA message to the control plane entity of the gateway device, and establish the second session of the service.

Alternatively, the sixth interaction module 32 is further configured to: receive a CCR message sent by the control plane entity of the gateway device, send a CCA message to the control plane entity of the gateway device, where the CCA message includes the service identifier, which is allocated by the OCS, of the service, and establish the second session of the service, where the control plane entity of the gateway sends the service identifier to the user plane entity of the gateway device.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment.

Figure 13:
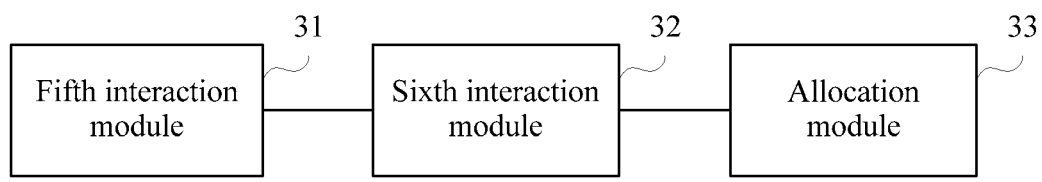
FIG. 13 is a schematic structural diagram of Embodiment 3 of an online charging device according to the present disclosure.

FIG. 13 is a schematic structural diagram of Embodiment 3 of an online charging device according to the present disclosure. As shown in FIG. 13, Embodiment 3 of an online charging device according to the present disclosure is based on Embodiment 2 of the online charging device according to the present disclosure. Further, the device further includes an allocation module 33.

The allocation module 33 is configured to allocate a first usage quota, where the first usage quota is used by the OCS to perform charging on the service.

According to quota usage information, the fifth interaction module 31 is further configured to perform charging interaction on the first session with the user plane entity of the gateway device. The allocation module 33 is further configured to allocate a second usage quota to the service.

Alternatively, according to quota usage information, the fifth interaction module 31 is further configured to: perform charging interaction on the first session with the user plane entity of the gateway device, deactivate the first session, and perform interaction on the second session with the control plane entity of the gateway device, so as to deactivate the second session.

The fifth interaction module 31 is further configured to: perform charging interaction on the first session with the user plane entity of the gateway device, and send the second usage quota to the user plane entity of the gateway device; in addition, the allocation module 33 is further configured to allocate the second usage quota to the service.

Alternatively, the fifth interaction module 31 is further configured to: perform charging interaction on the first session with the user plane entity of the gateway device, and interact with the user plane entity of the gateway device after the charging interaction is complete, so as to deactivate the first session.

The online charging device in this embodiment may be configured to execute the technical solution in the foregoing embodiment of the online charging method. Implementation principles and technical effects are similar, and details are not described herein again.

Figure 14:
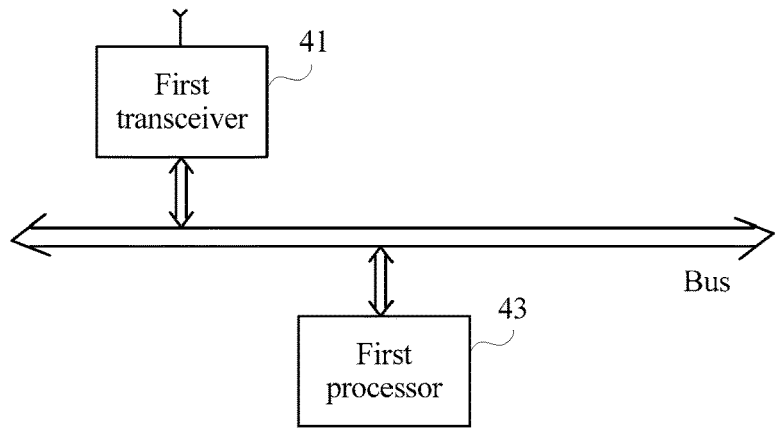
FIG. 14 is a schematic structural diagram of Embodiment 1 of a control plane apparatus of a gateway device according to the present disclosure.

FIG. 14 is a schematic structural diagram of Embodiment 1 of a control plane apparatus of a gateway device according to the present disclosure. As shown in FIG. 11, a control plane device of a gateway device in this embodiment may include: a first transceiver 41 and a first processor 43.

The first transceiver 41 is configured to send a service identifier to a user plane entity of the gateway device, where the service identifier is used by the user plane entity of the gateway device to interact with an OCS according to the service identifier, so as to establish a first session associated with the service and perform charging interaction on the first session, and the first session is a session between the user plane entity of the gateway device and the OCS.

The first processor 43 is configured to control the first transceiver 41, and is configured to process information that is received or sent by the first transceiver.

The control plane apparatus of the gateway device in this embodiment may be configured to execute the technical solution in the method embodiment shown in FIG. 1. Implementation principles and technical effects are similar, and details are not described herein again.

Figure 15:
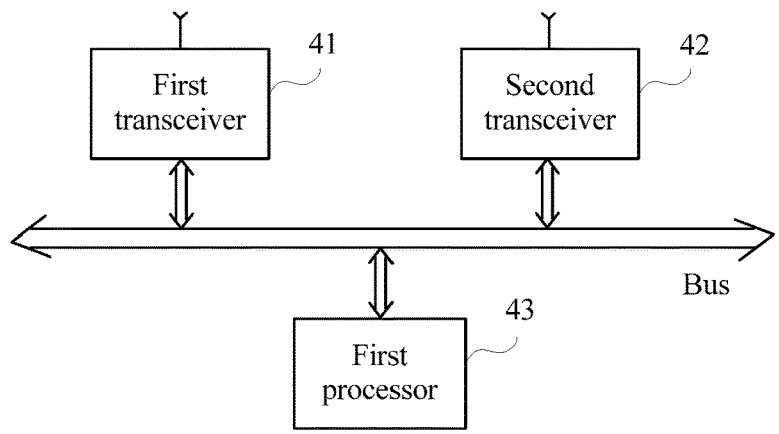
FIG. 15 is a schematic structural diagram of Embodiment 2 of a control plane apparatus of a gateway device according to the present disclosure.

As shown in FIG. 15, based on the foregoing embodiment, the apparatus further includes a second transceiver 42.

The second transceiver 42 is configured to: before the first transceiver sends the service identifier to the user plane entity of the gateway device, interact with the OCS, so as to establish a second session associated with the service requested by a user and determine the service identifier of the service, where the second session is a session between a control plane entity of the gateway device and the OCS.

The first processor 43 is further configured to control the second transceiver 42, and is configured to process information that is received or sent by the second transceiver 42.

Specifically, the second transceiver 42 is further configured to: send a CCR message to the OCS, where the CCR message includes the service identifier, which is allocated by the control plane entity of the gateway device, of the service; and receive a CCA message sent by the OCS, and establish the second session of the service.

Alternatively, the second transceiver 42 is further configured to: send a CCR message to the OCS; and receive a CCA message sent by the OCS, where the CCA message includes the service identifier, which is allocated by the OCS, of the service, and establish the second session of the service.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment.

The control plane apparatus of the gateway device in this embodiment may be configured to execute the technical solution in the foregoing method embodiment. Implementation principles and technical effects are similar, and details are not described herein again.

Embodiment 2 of a control plane apparatus of a gateway device according to the present disclosure is based on Embodiment 1 of the control plane apparatus of the gateway device according to the present disclosure. Further, the CCA message further includes information about a first usage quota.

After the second transceiver 42 receives the CCA message sent by the OCS, the first transceiver 41 is further configured to: send the information about the first usage quota to the user plane entity of the gateway device, where the user plane entity of the gateway device performs charging interaction on the first session with the OCS according to the information about the first usage quota.

The second transceiver 42 is further configured to receive a quota exhaustion message sent on the second session by the OCS, and interact with the OCS so as to deactivate the second session. Alternatively, the first transceiver 41 is further configured to receive a quota exhaustion message sent by the user plane entity of the gateway device.

The control plane apparatus of the gateway device in this embodiment may be configured to execute the technical solution in Embodiment 2 of the online charging method. Implementation principles and technical effects are similar, and details are not described herein again.

Figure 16:
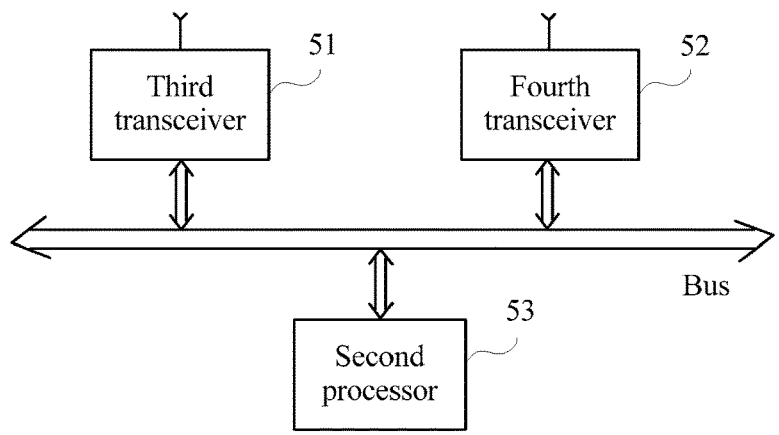
FIG. 16 is a schematic structural diagram of Embodiment 1 of a user plane device of a gateway device according to the present disclosure.

FIG. 16 is a schematic structural diagram of Embodiment 1 of a user plane device of a gateway device according to the present disclosure. As shown in FIG. 16, the user plane apparatus of the gateway device in this embodiment may include: a third transceiver 51, a fourth transceiver 52, and a second processor 53.

The third transceiver 51 is configured to receive a service identifier sent by a control plane entity of the gateway device.

The fourth transceiver 52 is configured to interact with an OCS by using the service identifier, so as to establish a first session of the service, and perform charging interaction on the first session with the OCS.

The second processor 53 is configured to control the third transceiver 51 and the fourth transceiver 52, and process information that is received or sent by the third transceiver 51 or the fourth transceiver 52.

Specifically, the service identifier may be an IMSI of a device, may be an identifier of a second session, may be a hash value of an IMSI of a device, may be an establishing moment of a second session, may be a random number, or may be a combination of any item of the foregoing, which is not limited in this embodiment.

The user plane apparatus of the gateway device in this embodiment may be configured to execute the technical solution in the method embodiment shown in FIG. 2. Implementation principles and technical effects are similar, and details are not described herein again.

Embodiment 2 of a user plane apparatus of a gateway device according to the present disclosure is based on Embodiment 1 of the user plane apparatus of the gateway device according to the present disclosure. Further, the third transceiver 51 is further configured to receive information about a first usage quota sent by the control plane entity of the gateway device, and is further configured to send a quota exhaustion message to the control plane entity of the gateway device.

The fourth transceiver 52 is further configured to perform charging interaction with the OCS by using the information about the first usage quota, and determine quota usage information by using the first usage quota; and according to the quota usage information, perform charging interaction on the first session with the OCS, and receive a second usage quota that is allocated by the OCS to the service; or according to the quota usage information, perform charging interaction on the first session with the OCS, deactivate the first session, and send a quota exhaustion message to the OCS.

The third transceiver 51 is further configured to send the quota exhaustion message to the control plane entity of the gateway device.

According to the quota usage information, the fourth transceiver 52 is specifically configured to perform charging interaction on the first session with the OCS; or perform charging interaction on the first session with the OCS, and deactivate the first session.

The user plane apparatus of the gateway device in this embodiment may be configured to execute the technical solution in Embodiment 4 of the online charging method. Implementation principles and technical effects are similar, and details are not described herein again.

Figure 17:
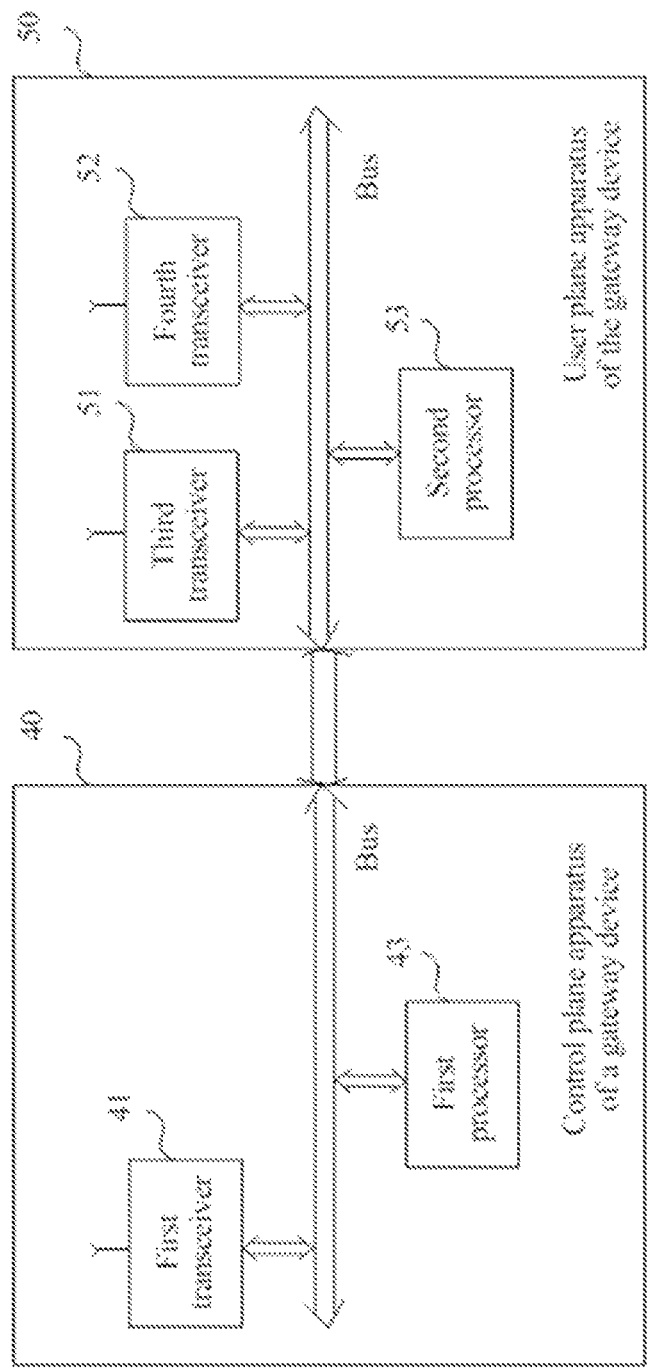
FIG. 17 is a schematic structural diagram of Embodiment 1 of a gateway apparatus according to the present disclosure.

FIG. 17 is a schematic structural diagram of Embodiment 1 of a gateway apparatus according to the present disclosure. As shown in FIG. 17, the gateway apparatus in this embodiment may include: a control plane apparatus 40 of a gateway device and a user plane apparatus 50 of the gateway device.

The control plane apparatus 40 of the gateway device includes: a first transceiver 41.

The user plane apparatus 50 of the gateway device includes: a third transceiver 51 and a fourth transceiver 52.

Specifically, a function of the first transceiver 41 is the same as that in Embodiment 1 or Embodiment 2 of the control plane device of the gateway device, a function of the third transceiver 51 or the fourth transceiver 52 is the same as that in Embodiment 1 or Embodiment 2 of the user plane device of the gateway device, and details are not described herein again.

The gateway apparatus in this embodiment may be configured to execute the technical solutions in Embodiment 1, Embodiment 2, Embodiment 3, and Embodiment 4 of the online charging method. Implementation principles and technical effects are similar, and details are not described herein again.

Figure 18:
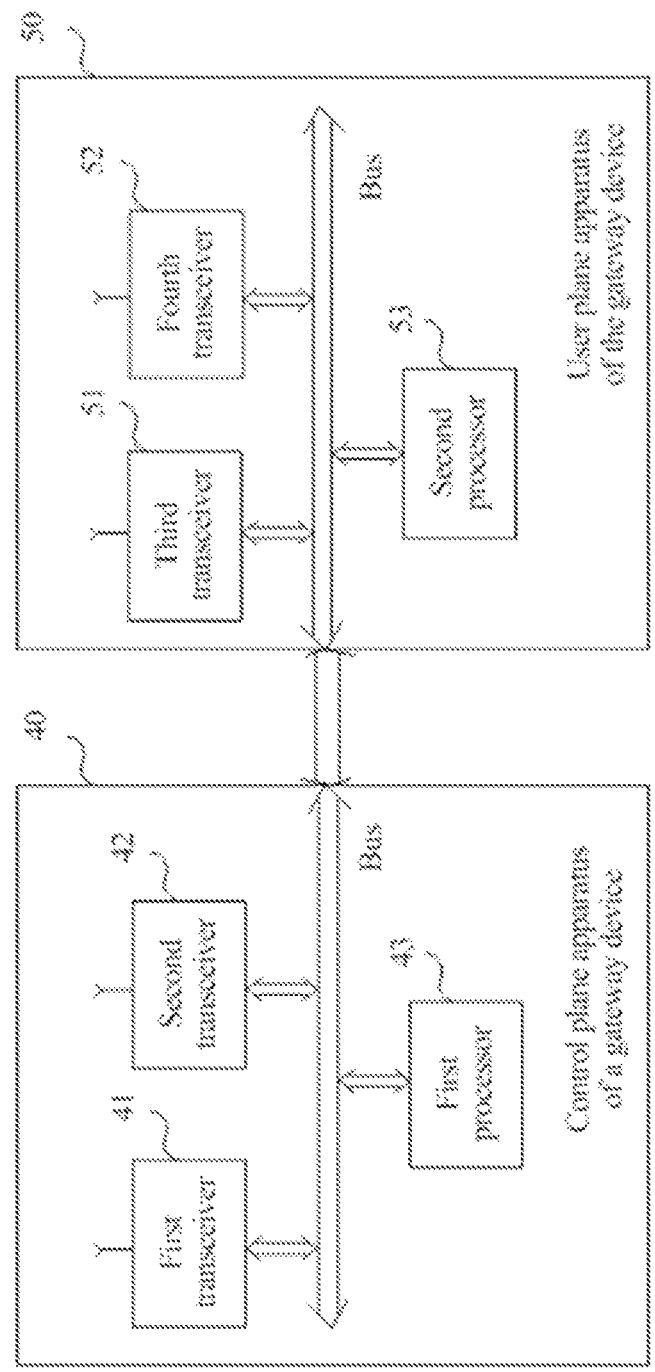
FIG. 18 is a schematic structural diagram of Embodiment 2 of a gateway apparatus according to the present disclosure.

As shown in FIG. 18, the control plane apparatus 40 of the gateway device further includes: a second transceiver 42.

A function of the second transceiver 42 is the same as that in the foregoing embodiment of the control plane device of the gateway device, and details are not described herein again.

Figure 19:
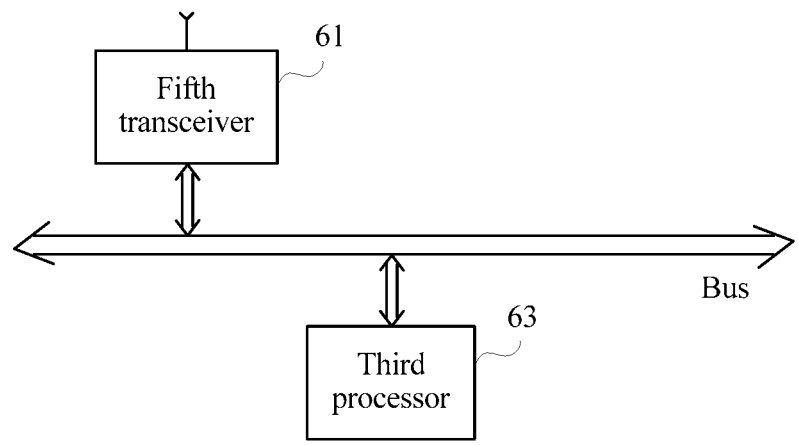
FIG. 19 is a schematic structural diagram of Embodiment 1 of an online charging apparatus according to the present disclosure.

FIG. 19 is a schematic structural diagram of Embodiment 1 of an online charging apparatus according to the present disclosure. As shown in FIG. 19, the online charging apparatus in this embodiment may include: a fifth transceiver 61 and a third processor 63.

The fifth transceiver 61 is configured to interact with a user plane entity of a gateway, so as to establish a first session of the service, and perform charging interaction on the first session with the user plane entity of the gateway.

The third processor 63 is configured to control the fifth transceiver 61, and process information that is received or sent by the fifth transceiver 61.

The online charging device in this embodiment may be configured to execute the technical solution in the foregoing embodiment of the online charging method. Implementation principles and technical effects are similar, and details are not described herein again.

Figure 20:
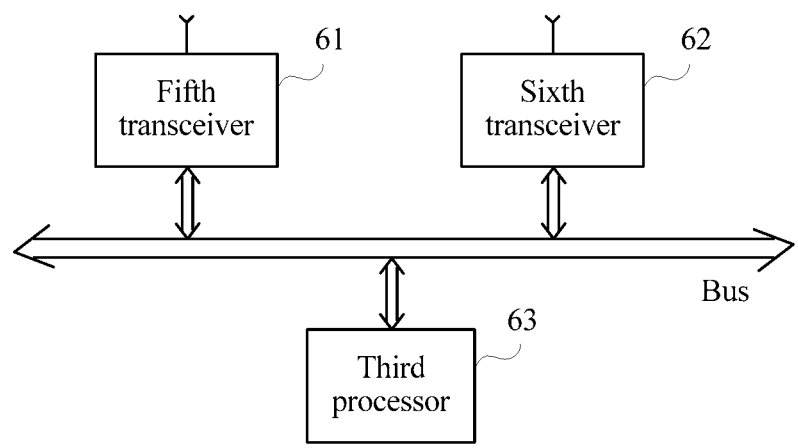
FIG. 20 is a schematic structural diagram of Embodiment 2 of an online charging apparatus according to the present disclosure.

As shown in FIG. 20, further, the apparatus further includes a sixth transceiver 62.

Specifically, the sixth transceiver 62 is configured to: receive a CCR message sent by a control plane entity of the gateway device, where the CCR message includes a service identifier, which is allocated by the control plane entity of the gateway device, of the service, and the control plane entity of the gateway sends the service identifier to the user plane entity of the gateway device; and send a CCA message to the control plane entity of the gateway device, and establish a second session of the service.

Alternatively, the sixth transceiver 62 is configured to: receive a CCR message sent by a control plane entity of the gateway device, send a CCA message to the control plane entity of the gateway device, where the CCA message includes a service identifier, which is allocated by an OCS, of the service, and establish a second session of the service, so that the control plane entity of the gateway sends the service identifier to the user plane entity of the gateway device.

More specifically, the service identifier may be an IMSI of a device, may be an identifier of the second session, may be a hash value of an IMSI of a device, may be an establishing moment of the second session, may be a random number, or may be a combination of any item of the foregoing, which is not limited in this embodiment.

The online charging device in this embodiment may be configured to execute the technical solution of the online charging method in FIG. 3. Implementation principles and technical effects are similar, and details are not described herein again.

Embodiment 2 of an online charging apparatus according to the present disclosure is based on Embodiment 1 of the online charging apparatus according to the present disclosure. Further, the third processor 63 is further configured to allocate a first usage quota, where the first usage quota is used by the OCS to perform charging on the service.

According to quota usage information, the fifth transceiver 61 is further configured to perform charging interaction on the first session with the user plane entity of the gateway device. The third processor 63 is further configured to allocate a second usage quota to the service.

Alternatively, according to quota usage information, the fifth transceiver 61 is further configured to: perform charging interaction on the first session with the user plane entity of the gateway device, deactivate the first session, and perform interaction on the second session with the control plane entity of the gateway device, so as to deactivate the second session.

When the user plane entity of the gateway device executes monitoring on a usage quota, the CCA message further includes information about the first usage quota, so that the control plane entity of the gateway device sends the information about the first usage quota to the user plane entity of the gateway device. The fifth transceiver 61 is further configured to: perform charging interaction on the first session with the user plane entity of the gateway device, and send the second usage quota to the user plane entity of the gateway device; in addition, the third processor 63 is further configured to allocate the second usage quota to the service.

Alternatively, when the user plane entity of the gateway device executes monitoring on a usage quota, the fifth transceiver 61 is further configured to: perform charging interaction on the first session with the user plane entity of the gateway device, and after the charging interaction is complete, interact with the user plane entity of the gateway device so as to deactivate the first session.

The online charging device in this embodiment may be configured to execute the technical solution in Embodiment 6 of the online charging method. Implementation principles and technical effects are similar, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for implementing direct interaction between a user plane entity of a gateway device and an online charging system (OCS), the method comprising:
    establishing, by a control plane entity of the gateway device, a second session with the OCS to determine a service identifier for a service, the service being associated with the second session;
    sending, by a first transceiver of the control plane entity of the gateway device, the service identifier for the service to the user plane entity, the service identifier being allocated by the OCS;
    establishing, by a second transceiver of the user plane entity coupled to a processor of the user plane entity, a first session with the OCS according to the service identifier, the service being associated with the first session between the user plane entity and the OCS;
    using, by the first transceiver of the control plane entity, the second session to communicate first service related messages to the OCS, the first service related messages being associated with the service;
    avoiding transmission of, by the first transceiver of the control plane entity, service related messages associated with another service to the OCS using the second session;
    using, by the second transceiver of the user plane entity, the first session to communicate second service related messages to the OCS, the second service related messages being associated with the service; and
    performing, by the processor and the second transceiver of the user plane entity, charging interaction on the first session by sending, on the first session, first information to the OCS without forwarding the first information to the control plane entity.

2. The method of claim 1, further comprising receiving, by the control plane entity, a service request for the service from user equipment.

3. The method of claim 2, wherein interacting by the control plane entity with the OCS to establish the second session comprises:
    sending, by the control plane entity, a credit control request (CCR) message to the OCS;
    receiving, by the control plane entity, a credit control answer (CCA) message including the service identifier from the OCS; and
    establishing, by the control plane entity, the second session.

4. The method of claim 3, wherein the CCA message further comprises second information about a first usage quota, and after receiving the CCA, the method further comprising:
    sending, by the control plane entity to the user plane entity, the second information about the first usage quota; and
    performing, by the user plane entity, charging interaction on the first session with the OCS according to the second information about the first-usage quota.

5. The method of claim 2, wherein the service identifier comprises at least one of an international mobile subscriber identity (IMSI) of the user equipment, an identifier of the second session, a hash value of the IMSI, an establishing moment of the second session, or a random number, and the first information comprising usage information of the service, geographic information about where the service is used, and quality of service (QoS) information of the service.

6. The method of claim 2, further comprising:
    receiving, by the control plane entity from the OCS, a quota exhaustion message on the second session; and
    interacting, by the control plane entity, with the OCS to deactivate the second session.

7. A method for implementing direct interaction between a user plane entity of a gateway device and an online charging system (OCS), the method comprising:
    receiving, by a transceiver of the user plane entity coupled to a processor of the user plane entity, a service identifier for a service from a control plane entity of the gateway device, the service identifier being allocated by the OCS, the service identifier being received by the control plane entity over a second session associated with the service, the second session communicating first service related messages to the OCS, the second session avoiding communication of service related messages associated with another service to the OCS;
    establishing, by the processor of the user plane entity and the transceiver of the user plane entity, a first session with the OCS according to the service identifier, the service being associated with the first session;
    using, by the transceiver of the user plane entity, the first session to communicate second service related messages to the OCS, the second service related messages being associated with the service; and
    performing, by the processor and the transceiver of the user plane entity, charging interaction on the first session with the OCS by sending, on the first session, first information to the OCS without forwarding the first information to the control plane entity.

8. The method of claim 7, wherein before performing the charging interaction on the first session with the OCS, the method further comprises:
    receiving, by the user plane entity, a first usage quota from the control plane entity; and
    performing, by the user plane entity, the charging interaction using the first usage quota.

9. The method of claim 8, wherein performing the charging interaction on the first session with the OCS comprises:
  determining, by the user plane entity, quota usage information using the first usage quota; and
  performing, by the user plane entity, the charging interaction according to the quota usage information, and the method further comprising receiving a second usage quota.

10. The method of claim 7, wherein performing the charging interaction on the first session with the OCS comprises deactivating the first session according to quota usage information.

11. The method of claim 7, wherein the service identifier comprises at least one of an international mobile subscriber identity (IMSI) of user equipment, an identifier of the second session, a hash value of the IMSI, an establishing moment of the second session, or a random number, and the first information comprising usage information of the service, geographic information about where the service is used, and quality of service (QoS) information of the service.

12. A gateway device for implementing direct interaction between a user plane entity of the gateway device and an online charging system (OCS), the gateway device comprising:
  the user plane entity, comprising:
    a first transceiver; and
    a first processor coupled to the first transceiver and configured to control the first transceiver; and
  a control plane entity comprising:
    a second transceiver configured to:
      establish a second session with the OCS to determine a service identifier for a service, the service being associated with the second session, the service identifier being allocated by the OCS;
      use the second session to communicate first service related messages to the OCS, the first service related messages being associated with the service;
      avoid transmission of service related messages associated with another service to the OCS using the second session; and
    a second processor coupled to the second transceiver and configured to direct the second transceiver to send the service identifier to the user plane entity of the gateway device, the first processor being further configured to:
    direct the first transceiver to:
      interact with the OCS according to the service identifier so as to cause the first transceiver to establish a first session with the OCS according to the service identifier;
      use the first session to communicate second service related messages to the OCS, the second service related messages being associated with the service; and
      perform charging interaction on the first session by sending, on the first session, first information to the OCS without forwarding the first information to the control plane entity, the first session being a session associated with the service between the user plane entity and the OCS.

13. The gateway device of claim 12, wherein the service identifier is requested by user equipment, and the second processor is configured to determine the service identifier before the control plane entity sends the service identifier to the user plane entity.

14. The gateway device of claim 13, wherein the second processor is further configured to direct the second transceiver to:
  send to the OCS a credit control request (CCR) message comprising the service identifier;
  receive a credit control answer (CCA) message from the OCS; and
  establish the second session.

15. The gateway device of claim 13, wherein the second processor is further configured to direct the second transceiver to:
  send a credit control request (CCR) message to the OCS;
  receive from the OCS a credit control answer (CCA) message comprising the service identifier, wherein the service identifier is allocated by the OCS; and
  establish the second session.

16. The gateway device of claim 15, wherein the CCA message further comprises second information about a first usage quota, and after the second processor receives the CCA message, the second processor is configured to direct the second transceiver to send the second information to the user plane entity of the gateway device.

17. The gateway device of claim 13, wherein the service identifier comprises at least one of an international mobile subscriber identity (IMSI) of user equipment, an identifier of the second session, a hash value of the IMSI, an establishing moment of the second session, or a random number, and the first information comprising usage information of the service, geographic information about where the service is used, and quality of service (QoS) information of the service.

18. The gateway device of claim 13, wherein the second processor is further configured to direct the second transceiver to:
  receive a quota exhaustion message on the second session from the OCS; and
  deactivate the second session with the OCS.

19. A user plane device of a gateway device for implementing direct interaction between the user plane device and an online charging system (OCS), the user plane device comprising:
  a processor;
  a first transceiver coupled to the processor and configured to receive a service identifier for a service from a control plane entity of the gateway device, the service identifier being allocated by the OCS, the service identifier being received by the control plane entity over a second session associated with the service, the second session communicating first service related messages to the OCS, the second session avoiding communication of service related messages associated with another service to the OCS; and
  a second transceiver coupled to the processor, the processor being configured to control the second transceiver to:
    establish a first session with the OCS according to the service identifier, the service being associated with the first session;
    use the first session to communicate second service related messages to the OCS, the second service related messages being associated with the service; and
    perform charging interaction on the first session with the OCS by sending, on the first session, first information to the OCS without forwarding the first information to the control plane entity.

20. The user plane device of claim 19, wherein the second transceiver is further configured to receive second information about a first usage quota from the control plane entity, and the processor is further configured to direct the second transceiver to perform charging interaction with the OCS using the second information.

21. The user plane device of claim 20, wherein the processor is further configured to determine quota usage information using the first usage quota, and the processor is further configured to direct the second transceiver to:

perform, according to the quota usage information, the charging interaction on the first session with the OCS and receive a second usage quota allocated by the OCS to the service; or perform, according to the quota usage information, the charging interaction on the first session with the OCS, send a quota exhaustion message to the OCS, and deactivate the first session.

22. The user plane device of claim 21, wherein the processor is further configured to control the first transceiver to send the quota exhaustion message to the control plane entity.

23. The user plane device of claim 19, wherein the processor is further configured to control the second transceiver to:

perform charging interaction on the first session with the OCS according to quota usage information; or according to quota usage information, perform charging interaction on the first session with the OCS and deactivate the first session.

24. The user plane device of claim 19, wherein the service identifier comprises at least one of an international mobile subscriber identity (IMSI) of user equipment, an identifier of the second session, a hash value of an IMSI of user equipment, an establishing moment of the second session, or a random number.

* * * * *